(12) United States Patent
Shimada et al.

(10) Patent No.: US 9,167,026 B2
(45) Date of Patent: Oct. 20, 2015

(54) COMMUNICATION SYSTEM, COMMUNICATION APPARATUS, AND CONTROL METHOD OF RELAY APPARATUS

(75) Inventors: Yusuke Shimada, Inazawa (JP); Kazutaka Yamamoto, Nagoya (JP); Hirokazu Banno, Iwakura (JP); Takeshi Nagasaki, Nagoya (JP); Masafumi Miyazawa, Nagoya (JP); Satoshi Watanabe, Nagoya (JP); Katsuaki Ito, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 459 days.

(21) Appl. No.: 13/291,430

(22) Filed: Nov. 8, 2011

(65) Prior Publication Data

US 2012/0113471 A1 May 10, 2012

(30) Foreign Application Priority Data

Nov. 8, 2010 (JP) ................................ 2010-250316
Nov. 7, 2011 (JP) ................................ 2011-243259

(51) Int. Cl.
*H04L 29/08* (2006.01)
*G06F 17/30* (2006.01)

(52) U.S. Cl.
CPC .......... *H04L 67/06* (2013.01); *G06F 17/30274* (2013.01); *H04L 67/2804* (2013.01); *H04L 67/2819* (2013.01)

(58) Field of Classification Search
None
See application file for complete search history.

(56) References Cited

U.S. PATENT DOCUMENTS 7,835,037 B2 11/2010 Koide
7,984,027 B2 7/2011 Tamura
(Continued)

FOREIGN PATENT DOCUMENTS

CN 1625895 A 6/2005
CN 101106631 A 1/2008
(Continued)

OTHER PUBLICATIONS

State Intellectual Property Office of the People'S Republic of China, Notification of First Office Action for Chinese Patent Application No. 201110351473.2 (counterpart to above-captioned patent application), mailed Nov. 5, 2013.
(Continued)

*Primary Examiner* — Fan Zhang
(74) *Attorney, Agent, or Firm* — Merchant & Gould PC

(57) ABSTRACT

A communication system includes: a communication apparatus; and a relay apparatus. The communication apparatus includes: a contents-summary-information address request unit; a contents-summary-information display unit; a selection-information transmission unit; a selection-completion notification unit; and a contents get unit. The relay apparatus includes: an order-information addition unit that adds order information of contents to electronic data information; a contents-summary-information address transmission unit that transmits address information of a contents summary information item and the electronic data information, to which the order information is added, in response to a request of transmission of the address information of the contents summary information item; a contents-address get unit that gets the address information of the contents selected based on selection information from the selection-completion notification unit; and a contents-address transmission unit that transmits the address information of the contents got by the contents-address get unit to the communication apparatus.

15 Claims, 16 Drawing Sheets

(56) References Cited

U.S. PATENT DOCUMENTS

| | | | |
|---|---|---|---|
| 8,490,084 | B1 | 7/2013 | Alford et al. |
| 8,566,872 | B2 | 10/2013 | Nonoyama |
| 2002/0100058 | A1* | 7/2002 | Hirose et al. ............... 725/113 |
| 2003/0065585 | A1 | 4/2003 | Satomi et al. |
| 2004/0128669 | A1 | 7/2004 | Fursi et al. |
| 2005/0105002 | A1 | 5/2005 | Maehara |
| 2005/0166228 | A1* | 7/2005 | Takatori et al. ............... 725/39 |
| 2007/0033192 | A1* | 2/2007 | Sakoh et al. .................... 707/10 |
| 2007/0083501 | A1 | 4/2007 | Pedersen et al. |
| 2007/0094258 | A1* | 4/2007 | Okuzawa ........................ 707/8 |
| 2007/0185885 | A1 | 8/2007 | Tamura |
| 2009/0083304 | A1 | 3/2009 | Dornbach et al. |
| 2009/0198820 | A1* | 8/2009 | Golla et al. .................... 709/228 |
| 2009/0222919 | A1 | 9/2009 | Liu et al. |
| 2010/0036855 | A1 | 2/2010 | Sasaki et al. |
| 2010/0121735 | A1 | 5/2010 | Shimooka |
| 2010/0245901 | A1* | 9/2010 | Kitaguchi ..................... 358/1.15 |
| 2011/0061099 | A1* | 3/2011 | Jiang et al. ..................... 726/12 |
| 2012/0113472 | A1 | 5/2012 | Urakawa et al. |

FOREIGN PATENT DOCUMENTS

| | | |
|---|---|---|
| CN | 101296155 A | 10/2008 |
| CN | 101325561 A | 12/2008 |
| CN | 101390394 A | 3/2009 |
| CN | 101872309 A | 10/2010 |
| JP | 2002-073466 A | 3/2002 |
| JP | 2004-080748 A | 3/2004 |
| JP | 2005-269250 A | 9/2005 |
| JP | 2006-260335 A | 9/2006 |
| JP | 2010-113730 A | 5/2010 |

OTHER PUBLICATIONS

Chinese Office Action issued in CN 201110346857.5, issued Dec. 4, 2013.

Office Action issued in related U.S. Appl. No. 13/291,635, mailed Jun. 18, 2014.

Office Action issued in related U.S. Appl. No. 13/291,635, mailed Dec. 26, 2014.

Office Action issued in related Japanese application No. 2011-02325, mailed Jul. 28, 2015.

* cited by examiner

| FIG. 3A |
| FIG. 3B |

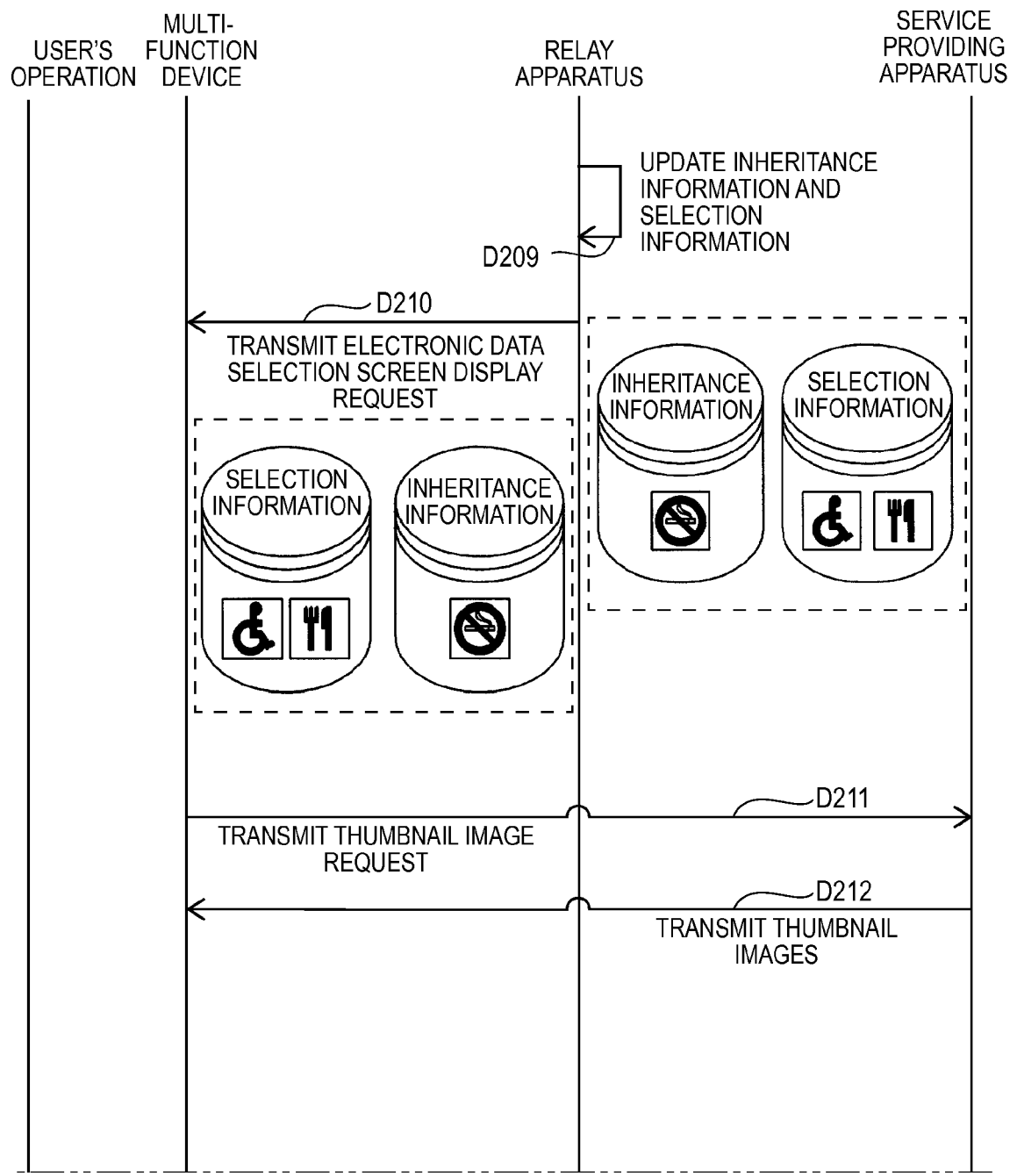

FIG. 7

| ELECTRONIC DATA ID | TITLE | THUMBNAIL URL |
|---|---|---|
| 23168411 | TRIANGLE | http://example.com/photo/23168411_t.jpg |
| 78820014 | WHEELCHAIR | http://example.com/photo/78820014_t.jpg |
| 80543002 | INTERROGATION MARK | http://example.com/photo/80543002_t.jpg |
| 27206545 | SPOON AND FORK | http://example.com/photo/27206545_t.jpg |
| ..... | ..... | ..... |

FIG. 8

| ELECTRONIC DATA ID WITH PRINTING ORDER INFORMATION | TITLE | THUMBNAIL URL |
|---|---|---|
| 23168411_1 | TRIANGLE | http://example.com/photo/23168411_t.jpg |
| 78820014_2 | WHEELCHAIR | http://example.com/photo/78820014_t.jpg |
| 80543002_3 | INTERROGATION MARK | http://example.com/photo/80543002_t.jpg |
| 27206545_4 | SPOON AND FORK | http://example.com/photo/27206545_t.jpg |
| ..... | ..... | ..... |

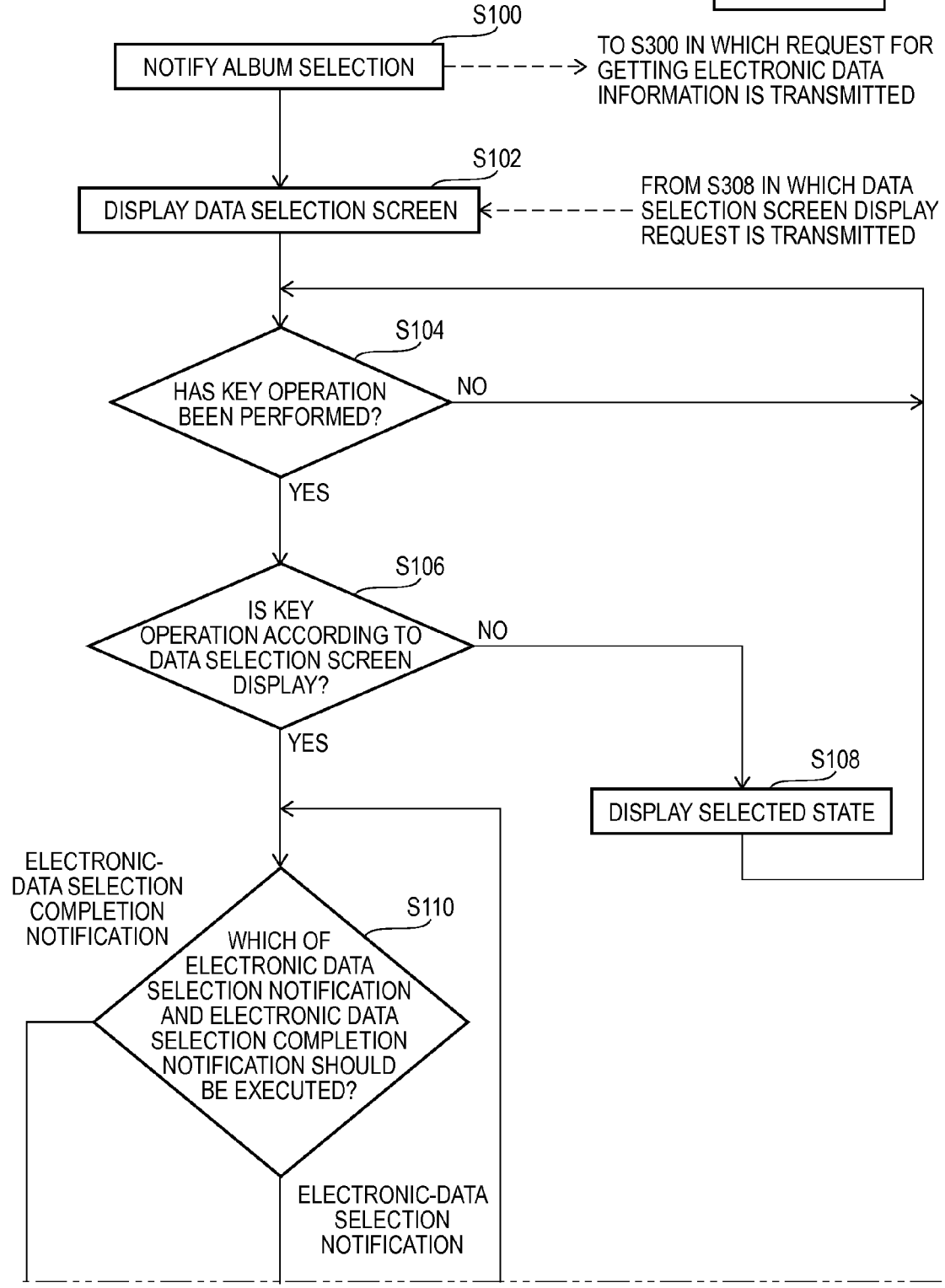

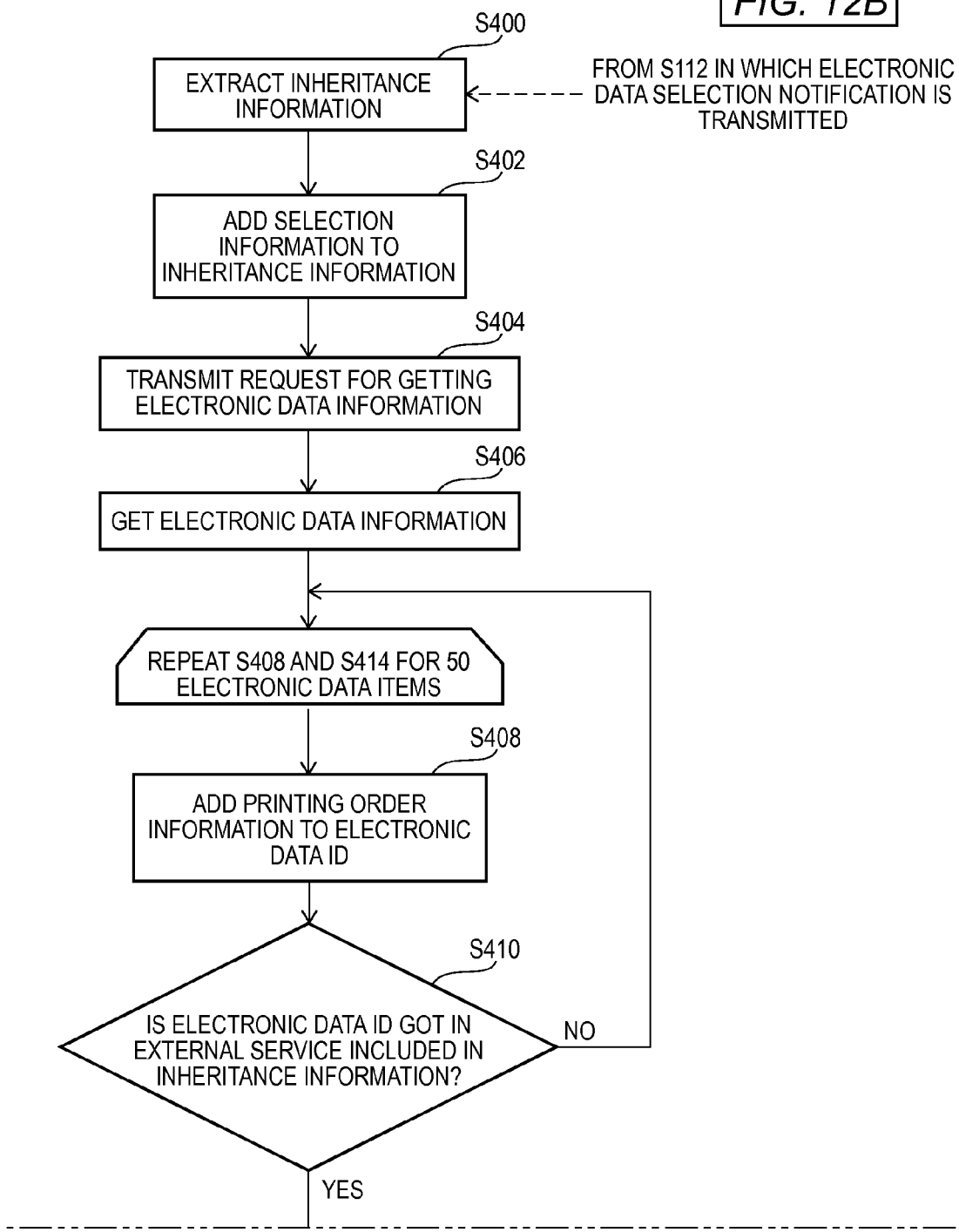

COMMUNICATION SYSTEM, COMMUNICATION APPARATUS, AND CONTROL METHOD OF RELAY APPARATUS

CROSS-REFERENCE TO RELATED APPLICATIONS

This application claims priority from Japanese Patent Application No. 2010-250316 filed on Nov. 8, 2010 and Japanese Patent Application No. 2011-243259 filed on Nov. 7, 2011, the entire subject matter of which is incorporated herein by reference.

TECHNICAL FIELD

The invention relates to a communication system including a communication apparatus and a relay apparatus connected to each other through a network, the communication apparatus, a control program of the relay apparatus, and control method of the relay apparatus.

BACKGROUND

There have been known image reading apparatuses for uploading electronic data of read images to servers, print apparatuses for printing electronic data downloaded from servers, and the like. There has been proposed a related-art image reading apparatus for uploading electronic data of read images to a server. In a case where a maker of image reading apparatuses or print apparatuses provides an electronic-file storing service, the maker needs to prepare dedicated servers for storing uploaded electronic data on maker's own.

Meanwhile, recently, electronic-data storing services capable of storing electronic data in databases prepared on networks by server providers are in widespread use. For example, Picasa (a registered trademark) web album and flickr (a registered trademark) are examples of the electronic-data storing services. Users can use terminal devices having web browsers to upload or download desired electronic data in the electronic-data storing services. In many electronic-data storing services, their own application program interfaces (API) are disclosed. The APIs can be used to provide new services cooperating with the electronic-data storing services to users.

SUMMARY

Makers of communication apparatuses supposes a communication apparatus which receives electronic data stored in electronic-data storing services and outputs the electronic data, as part of new services cooperating with the electronic-data storing services. An amount of electronic data which a communication apparatus can receive at once is limited due to a memory capacity. For this reason, the communication apparatus receives download information for downloading an amount of electronic data, which can be received at once, in the electronic-data storing services, by using the APIs disclosed in the electronic-data storing services, downloads an amount of electronic data corresponding to a memory capacity by using the received download information, and receives and outputs the downloaded electronic data. In this type, in a case of receiving electronic data, a process of receiving download information using the APIs is required, and thus a load of updating the APIs and updating programs for selecting and managing desired electronic data information is imposed on the communication apparatus.

Further, it can be considered a case of providing a relay apparatus between the communication apparatus and the electronic-data storing services and using the electronic-data storing services. However, for example, in a case of using a plurality of services, it is required to select and manage electronic data information, and thus a load is imposed on the operation of the relay apparatus.

Therefore, illustrative aspects of the present invention provide a communication system, a communication apparatus, and a control method of the relay apparatus, capable of implementing a new service cooperating with the electronic-data storing services in the communication apparatus.

According to a first aspect of the invention, there is provided a communication system comprising: a communication apparatus; and a relay apparatus connected to the communication apparatus through a network, wherein the communication apparatus comprises: a contents-summary-information address request unit that requests transmission of address information of a contents summary information item on the network; a contents-summary-information display unit that is configured to: get the address information of the contents summary information item as a response of the request of the contents-summary-information address request unit from the relay apparatus; get the contents summary information item according to the got address information; and display the contents summary information item; a selection-information transmission unit that transmits selection information of contents selected according to the contents summary information item displayed by the contents-summary-information display unit and previous selection information; a selection-completion notification unit that transmits a contents-selection-completion notification to the relay apparatus; and a contents get unit that gets the contents from the network on the basis of address information of the contents received as a response of the contents-selection-completion notification of the selection-completion notification unit from the relay apparatus, and wherein the relay apparatus comprises: an order-information addition unit that adds order information of the contents to electronic data information that is got in accordance with the previous selection information transmitted by the selection-information transmission unit; a contents-summary-information address transmission unit that transmits the address information of the contents summary information item and the electronic data information, to which the order information is added, in response to the request of transmission of the address information of the contents summary information item by the contents-summary-information address request unit; a contents-address get unit that gets the address information of the contents on the network, wherein the contents are selected on the basis of the selection information from the selection-completion notification unit; and a contents-address transmission unit that transmits the address information of the contents got by the contents-address get unit to the communication apparatus.

According to a second aspect of the invention, in the communication system, wherein the order information includes download order information for the contents, and wherein the relay apparatus further comprises a download-order sorting unit that sorts the selection information stored in a selection-information storage unit, on the basis of the download order information, in response to the selection-completion notification of the communication apparatus.

According to a third second aspect of the invention, there is provided a communication apparatus connected to a relay apparatus through a network, the communication apparatus comprising: a contents-summary-information address request unit that requests transmission of address information of a contents summary information item on the network; a contents-summary-information display unit that is configured to: get the address information of the contents summary information item as a response of the request of the contents-summary-information address request unit from the relay apparatus; get the contents summary information item according to the got address information; and display the contents summary information item; a selection-information transmission unit that transmits selection information of contents selected according to the contents summary information item displayed by the contents-summary-information display unit, together with previous selection information; a selection-completion notification unit that transmits a contents-selection-completion notification to the relay apparatus; and a contents get unit that gets the contents from the network on the basis of address information of the contents received as a response of the contents-selection-completion notification of the selection-completion notification unit from the relay apparatus.

According to a fourth aspect of the invention, the communication apparatus further comprises: a display information update unit that requests update of the contents summary information item displayed by the contents-summary-information display unit, wherein in a case where update is requested by the display information update unit, address information of a new contents summary information item is got in response to a request of the contents-summary-information address request unit.

According to a firth aspect of the invention, there is provided a control method of relay apparatus connected to the communication apparatus according to the third aspect through a network, comprising: an order-information addition unit that adds order information of the contents to electronic data information that is got in accordance with the previous selection information transmitted by the communication apparatus; a contents-summary-information address transmission unit that transmits address information of the contents summary information item and the electronic data information, to which the order information is added, in response to the request of transmission of the address information of the contents summary information item from the communication apparatus; a contents-address get unit that gets the address information of the contents on the network, wherein the contents are selected on the basis of the selection information in response to the selection-completion notification from the communication apparatus; and a contents-address transmission unit that transmits the address information of the contents got by the contents-address get unit to the communication apparatus.

According to a sixth aspect of the invention, there is provided a non-transitory computer-readable medium having a control program stored thereon and readable by a computer for controlling a relay apparatus connected to the communication apparatus according to the third aspect through a network, said control program, when executed by the computer, causes the computer to function as: an order-information addition unit that adds order information of the contents to electronic data information that is got in accordance with the previous selection information received from the communication apparatus; a contents-summary-information address transmission unit that transmits address information of the contents summary information item and the electronic data information, to which the order information is added, in response to the request of transmission of the address information of the contents summary information item from the communication apparatus; a contents-address get unit that gets the address information of the contents on the network, wherein the contents re selected on the basis of the selection information in response to the selection-completion notification from the communication apparatus; and a contents-address transmission unit that transmits the address information of the contents got by the contents-address get unit to the communication apparatus.

According to the communication system according to the first aspect, the communication apparatus according to the third aspect, the control method of the relay apparatus according to the fifth aspect, and the control program of the relay apparatus according to the sixth aspect, it is possible to implement a relay apparatus using a stateless server. The stateless server does not need a mechanism, such as a database, for managing the status of the communication apparatus connected thereto. Therefore, it is possible to reduce a load attributable to the operation of the relay apparatus.

According to the communication system according to the second aspect, it is possible to determine a download order for every contents. Therefore, even in a case where a number of contents are selected, the contents can be downloaded in the selected order, so that it is convenient for the user.

According to the communication apparatus according to the fourth aspect, even in a case where there is a limit in the contents selecting function of the communication apparatus, it is possible to sequentially update and select the contents.

BRIEF DESCRIPTION OF THE DRAWINGS

FIGS. 5A and 5B are (third) sequence diagram views illustrating the example of the operation of the service cooperation system;

FIG. 7 shows a table representing a correspondence among electronic data IDs, titles, and thumbnail URLs;

FIG. 8 shows a table representing a correspondence among electronic data IDs with printing order information, titles, and thumbnail URLs;

FIGS. 9A and 9B are flow charts illustrating an electronic data selection operation of a multi-function device;

FIGS. 12A and 12B are flow charts regarding from when a relay apparatus extracts inheritance information to when the relay apparatus transmits an electronic-data display request to the multi-function device.

DETAILED DESCRIPTION

Hereinafter, exemplary embodiments of the present invention will be described with reference to the accompanying drawings. The drawings to be referred to are used for explaining technical features usable in the present invention. Configurations of devices, apparatuses, and systems, flow charts of various processes, and the like (which will be described later) are simple explanation examples. They are not intended to limit the present invention.

<Outline of Service Cooperation System 10>

Figure 1:
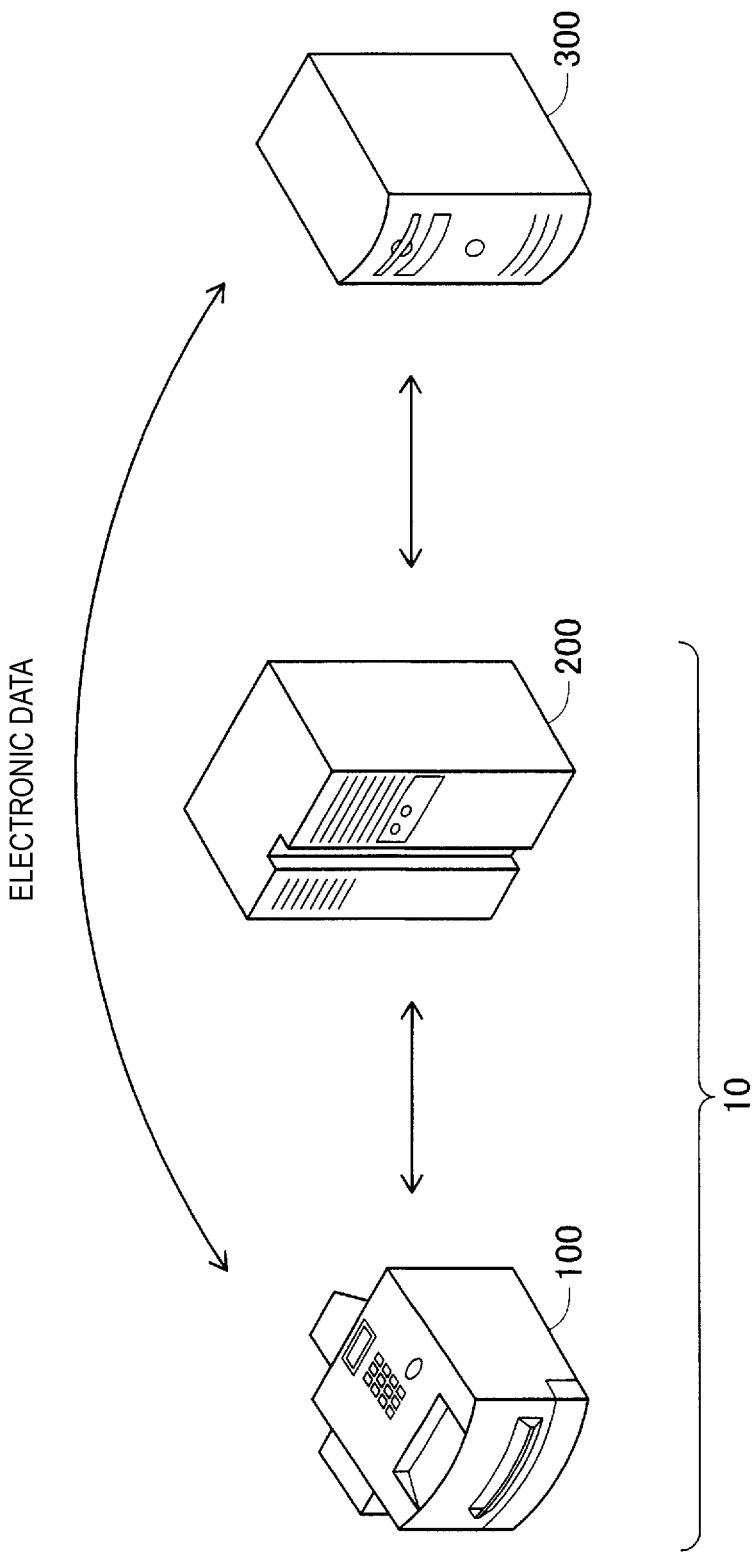
FIG. 1 is a schematic diagram illustrating an outline of a service cooperation system according to an exemplary embodiment of the invention.

An outline of a service cooperation system 10 according to an exemplary embodiment of the present invention will be described with reference to FIG. 1. The service cooperation system 10 includes a multi-function device 100 and a relay apparatus 200. The service cooperation system 10 can upload or download electronic data or download thumbnail images of electronic data in an electronic-data storing service provided by a service provider.

The electronic-data storing service is provided by a service providing apparatus 300 which each service provider places on the Internet. Specifically, the service providing apparatus 300 is a known web server. The service providing apparatus 300 communicates with other terminals connected to the Internet on the basis of HTTP or HTTPS so as to provide a predetermined service to the terminals.

The multi-function device 100 is specifically a small-sized digital combined machine. The multi-function device 100 has a printing function, a scanner function, a fax function, and a copy function.

A user of the multi-function device 100 can upload electronic data of an image read by the scanner function of the multi-function device 100 to the electronic-data storing service.

Further, the user of the multi-function device 100 can display electronic data and thumbnail images of the electronic data, downloaded in the electronic-data storing service, on a display unit 150 or can print electronic data and thumbnail images of the electronic data, downloaded in the electronic-data storing service, by the print function of the multi-function device 100.

The multi-function device 100 uploads or downloads electronic data in cooperation with the relay apparatus 200. The multi-function device 100 obtains URLs in the electronic-data storing service through the relay apparatus 200. The URLs include an upload destination URL which is an URL of an upload destination of electronic data in the electronic-data storing service, an electronic-data URL which is a URL of electronic data to be downloaded in the electronic-data storing service, and so on. However, in order to transmit or receive binary data of a large amount of electronic data, the multi-function device 100 communicates directly with the electronic-data storing service without using the relay apparatus 200. Therefore, according to the service cooperation system 10, it is possible to suppress an amount of data passing through the relay apparatus 200. Further, it is possible to suppress a load on the relay apparatus 200.

The relay apparatus 200 may be a known apparatus having a server function. The relay apparatus 200 may also be prepared by a maker of the multi-function device 100. Alternatively, it can also be considered to use, as the relay apparatus 200, a known rental server or a virtual machine which functions as a server in cooperation with a plurality of physical apparatuses as represented by EC2 of Amazon (a registered trademark). In this case, the operational cost of the relay apparatus 200 changes depending to the amount of data passing through the relay apparatus 200 and a load on the relay apparatus 200 for processing. Therefore, in the case of using a rental server or a virtual machine, the operational cost of the relay apparatus 200 can be suppressed by reducing the amount of data passing through the relay apparatus 200 or reducing the load on the relay apparatus 200. Further, even in a case where the relay apparatus 200 is prepared by the maker, since the relay apparatus 200 does not need high processing performance, the equipment investment for the relay apparatus can be suppressed.

<Hardware Configuration of Service Cooperation System 10>

Figure 2:
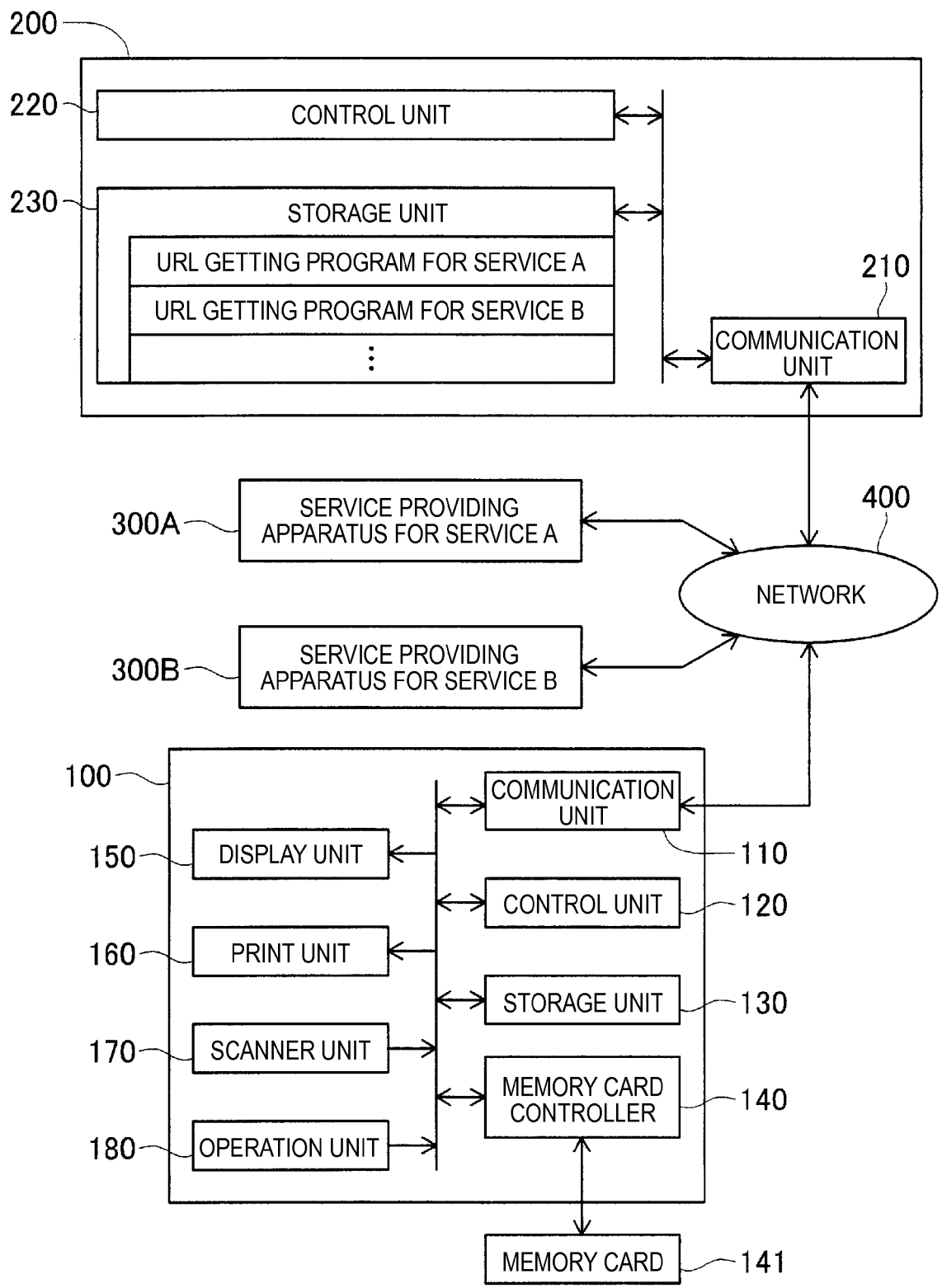
FIG. 2 is a block diagram illustrating a hardware configuration of the service cooperation system.
Figures 3, 3A:
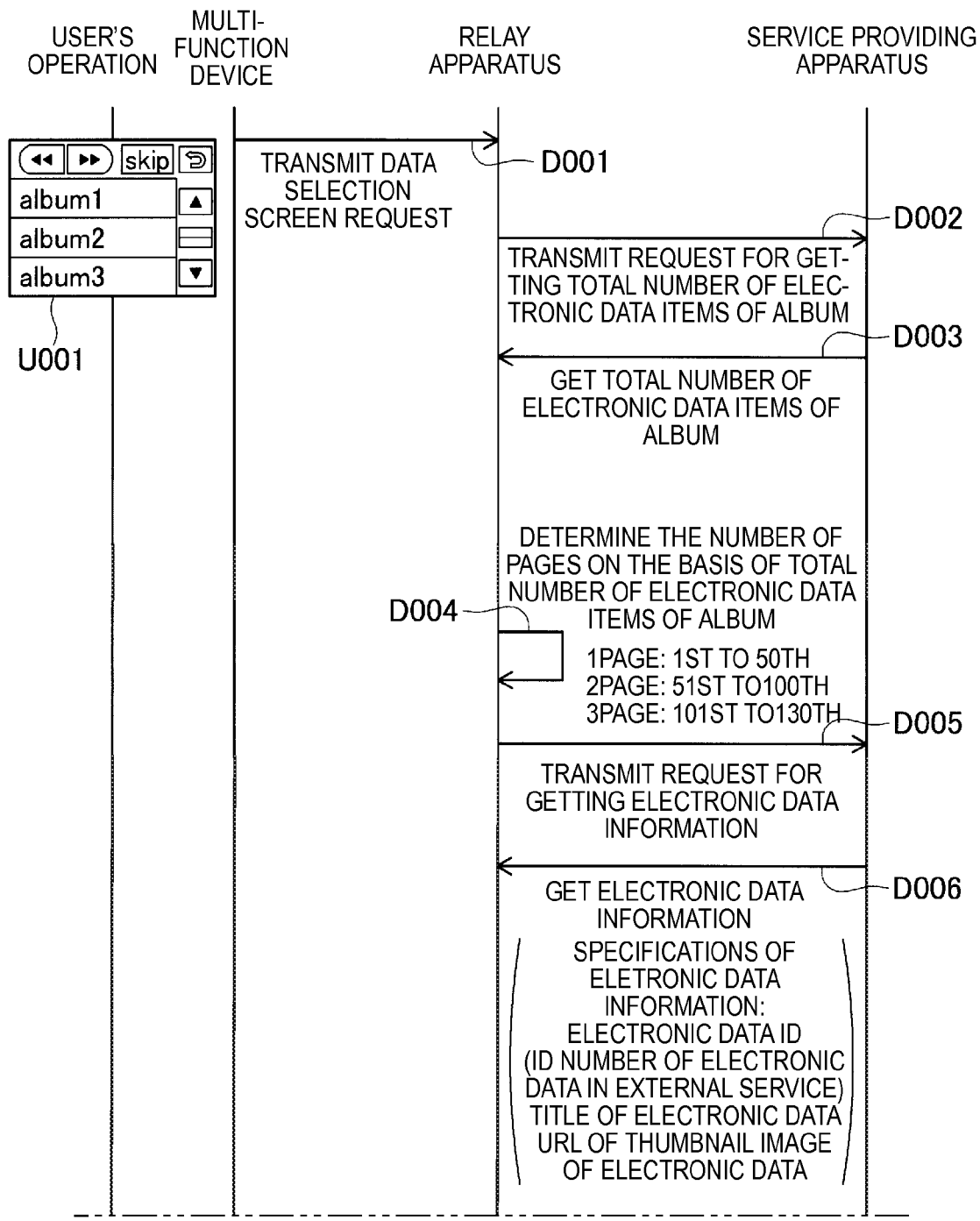
FIGS. 3A and 3B are (first) sequence diagram views illustrating an example of the operation of the service cooperation system.
Figure 3B:
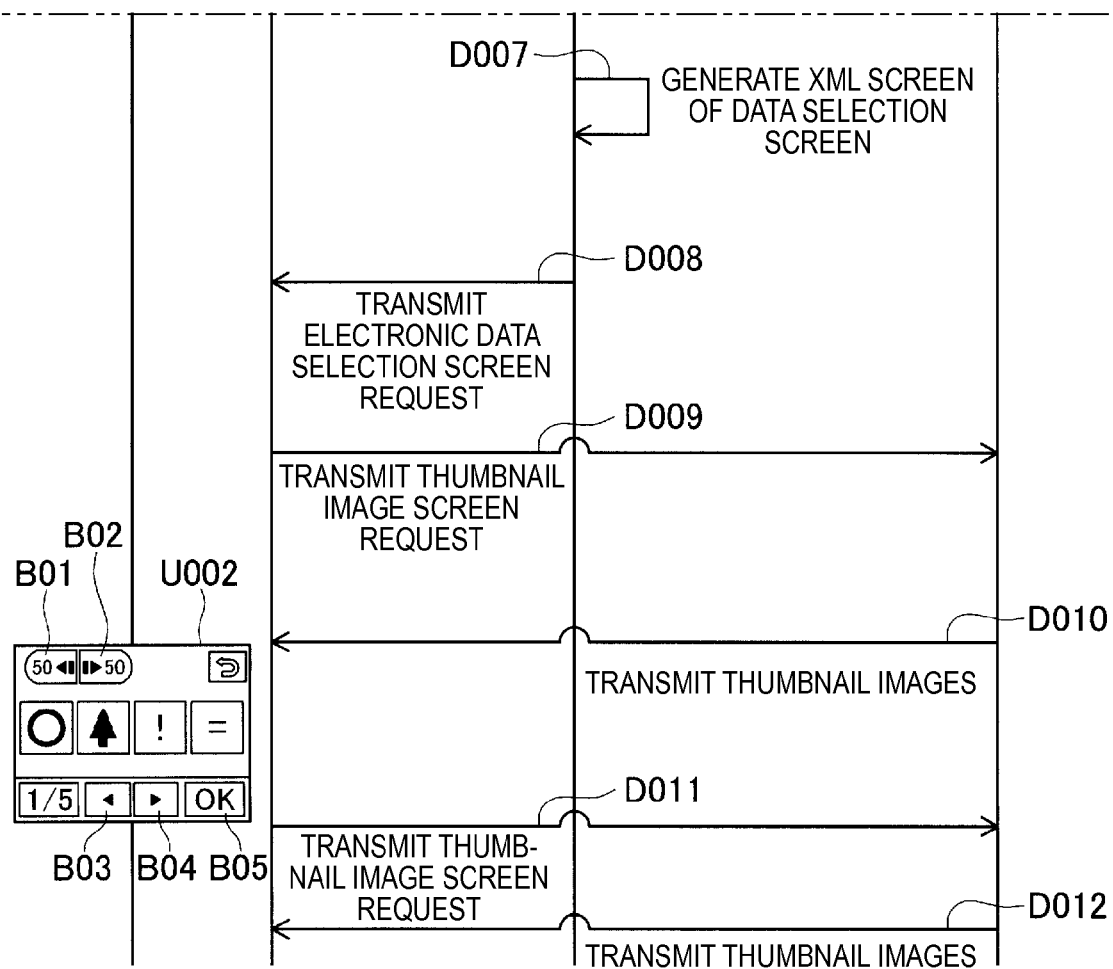
Figure 4A:
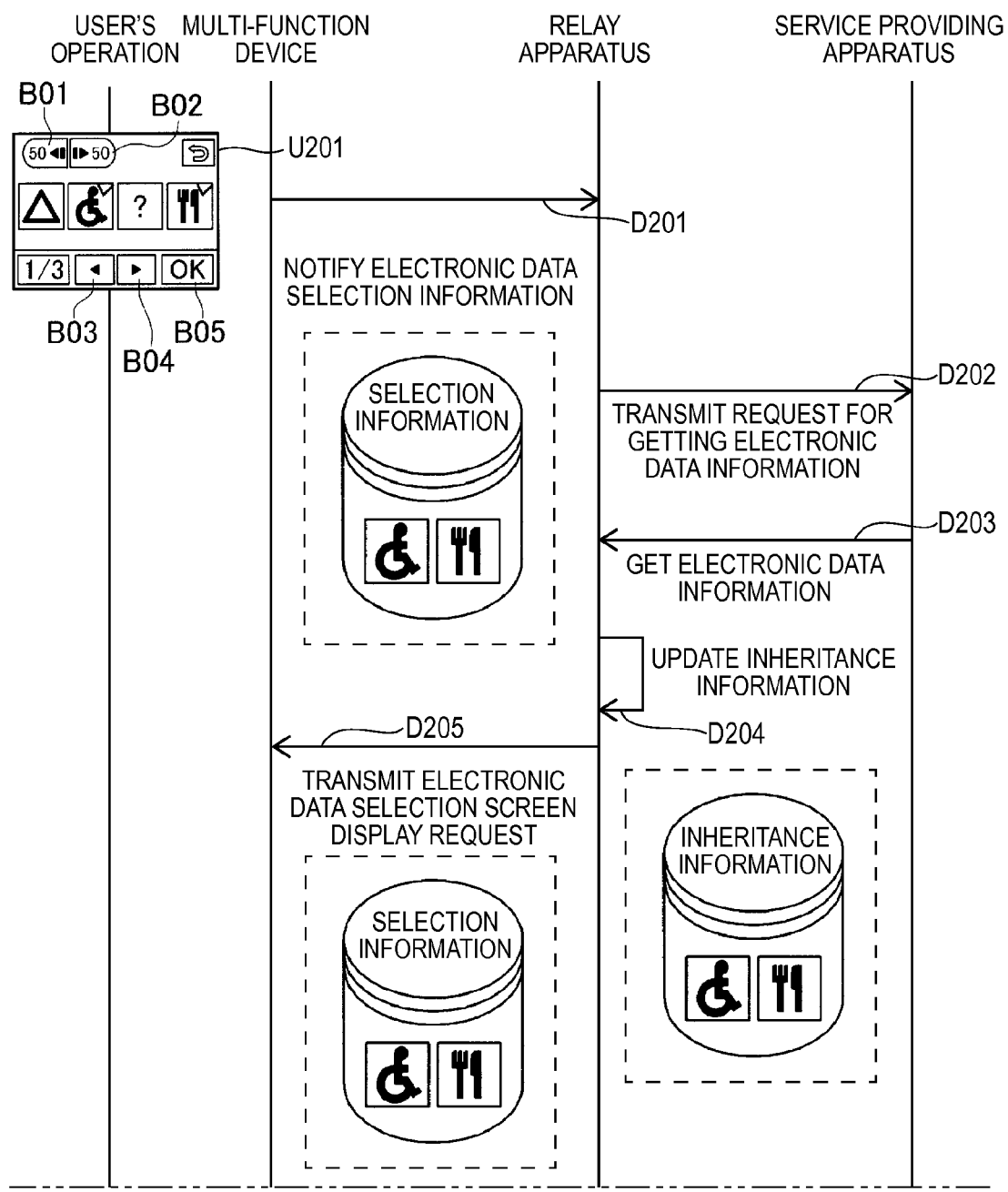
FIGS. 4A and 4B are (second) sequence diagram views illustrating the example of the operation of the service cooperation system.
Figure 4B:
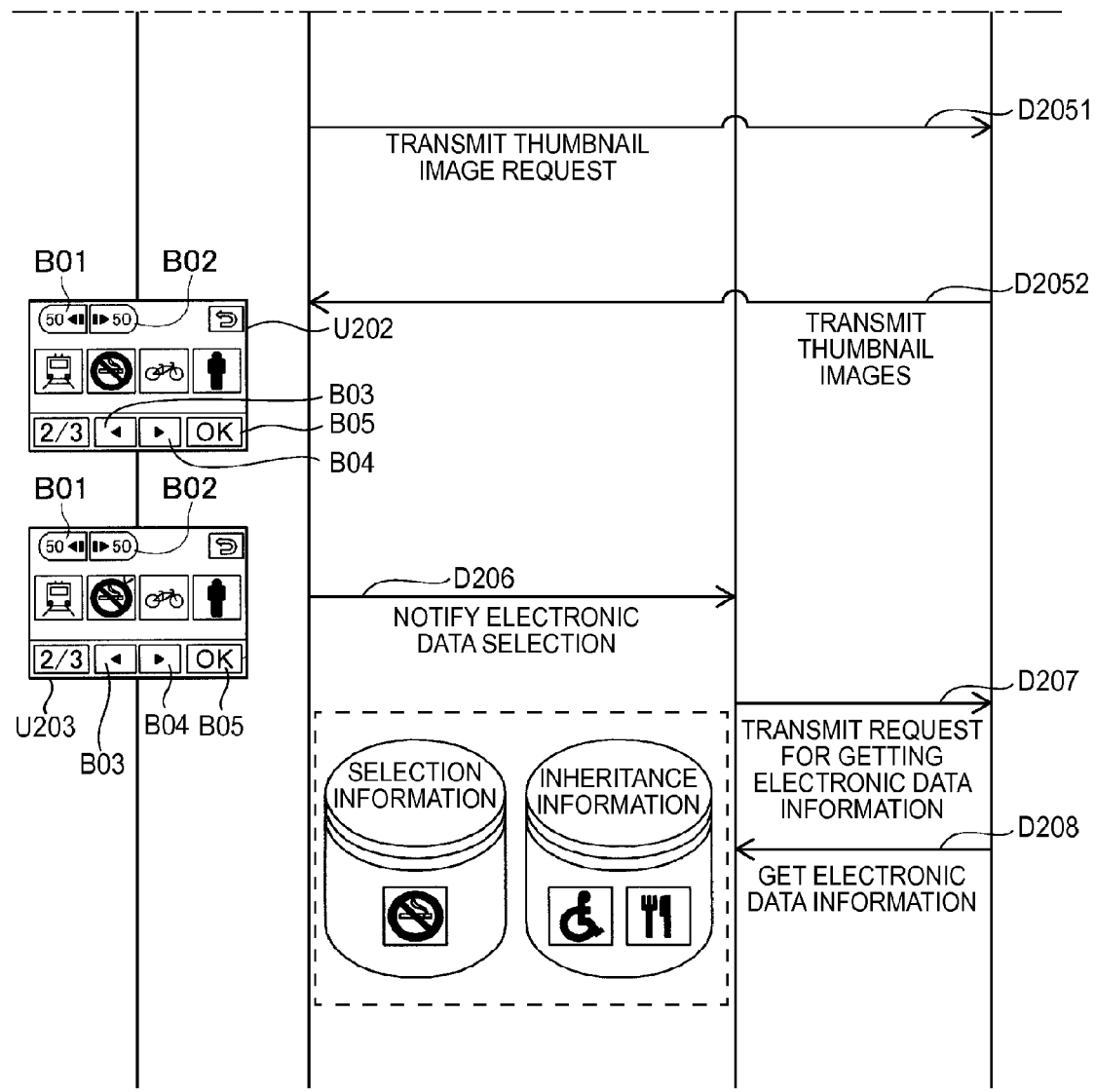

A hardware configuration of the service cooperation system 10 will be described with reference to FIG. 2. The following description will be made on assumption that the service cooperation system 10 performs cooperation of two electronic-file storing services, that is, a service A and a service B. In the following description, a service providing apparatus 300 for the service A is referred to as a service providing apparatus 300A. Also, a service providing apparatus 300 for the service B is referred to as a service providing apparatus 300B. In a case where it is unnecessary to particularly distinguish both sides from each other, the service providing apparatus 300A and the service providing apparatus 300B are generally referred to as the service providing apparatus 300. The multi-function device 100, the relay apparatus 200, the service providing apparatus 300A, and the service providing apparatus 300B are connected to one another through a network 400. As the network 400, for example, an Internet network can be used. The multi-function device 100, the relay apparatus 200, and the service providing apparatus 300 perform data transmission and reception with one another on the basis of HTTP.

First, a hardware configuration of the multi-function device 100 will be described. The multi-function device 100 includes a communication unit 110, a control unit 120, a storage unit 130, a memory card controller 140, a display unit 150, a print unit 160, a scanner unit 170, and an operation unit 180.

The communication unit 110 is a device for performing communication with other devices connected to the network. As the communication unit 110, a known network card can be used.

The control unit 120 includes a CPU, and a ROM and RAM connected to the CPU (not shown). The CPU controls the operation of the multi-function device 100 according to programs stored in the ROM. The programs stored in the ROM include a rendering driver for generating a screen on the basis of a text written in a markup language such as XML. The RAM is a storage device for temporarily storing various kinds of data.

The storage unit 130 is a non-volatile storage device such as a NAND-type flash memory. The storage unit 130 stores user identification information for identifying a user of the multi-function device 100, various set information, etc.

The memory card controller 140 controls the memory of a memory card 141 connected to the multi-function device 100. Specifically, the memory card controller 140 performs writing of data in the memory card 141, erasing of data stored in the memory card 141, reading of data stored in the memory card 141, or the like, on the basis to an instruction of the control unit 120. In the memory card 141, electronic data having a predetermined format are stored. The user can store electronic data downloaded from the service providing apparatus 300 in the memory card 141.

The display unit 150 is a display device having a display such as a known LCD. The display unit 150 displays predetermined information such as a menu item selection screen (which will be described later), on the basis of an instruction form the control unit 120.

The print unit 160 is a device which prints images according to an instruction of the control unit 120.

The scanner unit 170 is a device that reads images recorded on a sheet set by a user. The scanner unit 170 reads images according to an instruction of the control unit 120.

The operation unit 180 is a device that includes a plurality of operation buttons operable by the user, and transmits signals based on the pushing operation of the user to the control unit 120. The user can input a desired instruction by operating the operation unit 180.

Next, a hardware configuration of the relay apparatus 200 will be described. The description of the present exemplary embodiment will be made on assumption that the relay apparatus 200 is a physically existing server. Incidentally, the relay apparatus 200 may be a virtual machine, such as EC2, which functions as a server in cooperation with a plurality of physical devices as described above.

The relay apparatus 200 includes a communication unit 210, a control unit 220, and a storage unit 230.

The communication unit 210 is a device for performing communication with other devices connected to the network. As the communication unit 210, a known network card can be used.

The control unit 220 includes a CPU, and a ROM and RAM connected to the CPU (not shown). The CPU controls the operation of the relay apparatus 200 according to programs stored in the ROM and the storage unit 230. The RAM is a storage device for temporarily storing various data.

The storage unit 230 is a non-volatile storage device such as a hard disk drive. The storage unit 230 stores a plurality of software modules including a URL getting program for the service A and a URL getting program for the service B. Further, the storage unit 230 stores a relay program (not shown) for relaying communication between the multi-function device 100 and the service providing apparatus 300 in cooperation with the plurality of modules.

The URL getting program for the service A is a program which gets a thumbnail URL or electronic-data URL from the service providing apparatus 300A by using the API disclosed in the service A. The thumbnail URL is a URL indicating a storage position of a thumbnail image which is displayed to enable the user to select electronic data to be downloaded.

The URL getting program for the service B is a program which gets a thumbnail URL or electronic-data URL from the service providing apparatus 300B by using the API disclosed in the service B.

The user of the multi-function device 100 can designate a desired service of a plurality of electronic-data storing services. Then, the user of the multi-function device 100 can download desired electronic data in the designated service. Further, the user of the multi-function device 100 can select whether to print electronic data downloaded in the electronic-data storing service by the print unit 160 or to store the downloaded electronic data in the memory card 141 connected to the multi-function device 100.

<Operation of Service Cooperation System 10>

Next, an example of the operation of the service cooperation system 10 will be described with reference to FIGS. 3 to 6. FIGS. 3 to 6 are sequence diagrams illustrating an example of the operation of the service cooperation system 10. In this example, a flow in a case where the user of the multi-function device 100 selects printing of electronic data downloaded in the electronic-data storing service will be described. In the following description, the electronic-data storing service is simply referred to as the service.

In the present exemplary embodiment, a number of thumbnail URLs and electronic-data identification information items which can be downloaded from the service providing apparatus 300 at once is, for example, 50. The number of thumbnail URLs and electronic-data identification information items which can be downloaded at once is determined on the basis of a processing capability of the multi-function device 100 or the relay apparatus 200, for example, during designing of the multi-function device 100 and/or the relay apparatus 200. The service providing apparatus 300 manages a collection of a plurality of electronic data items in units of albums. For example, in the present exemplary embodiment, each album includes 130 electronic data items. When the user operates the operation unit 180 of the multi-function device 100 so as to select an album including electronic data to be downloaded, and a service corresponding to the album from a list of albums (album1, album2, and album3) of a data selection screen U001 (see FIG. 3) displayed on the display unit 150, in step D001, the multi-function device 100 transmits a data selection screen request to the relay apparatus 200. The data selection screen request includes service identification information which is information for identifying the service selected by the user, and user identification information which is information for identifying the user.

Then, in step D002, the relay apparatus 200 issues a request of getting the total number of electronic data items of the album to the service providing apparatus 300. Subsequently, in step D003, the service providing apparatus 300 notifies the total number of electronic data items of the album to the relay apparatus 200. The relay apparatus 200 deals with the electronic data items of each album in units of pages each of which may include up to 50 electronic data items which can be received at once. When the relay apparatus 200 gets the total number of electronic data items of the album, in step D004, the relay apparatus 200 determines what the number of the current page is. In the present exemplary embodiment, since each album of the service providing apparatus 300 includes 130 electronic data items, the control unit 220 of the relay apparatus 200 determines that the current page is the first page with respect to the 1st to 50th electronic data items correspond to the first page, the current page is the second page with respect to the 51st to 100th electronic data items, and the current page is the third page with respect to the 101st to 130th. Next, in step D005, the relay apparatus 200 requests electronic data information (an electronic data ID, an electronic data title, and a thumbnail URL) regarding to each of the electronic data items corresponding to a page from the service providing apparatus 300 according to a request of the multi-function device 100.

Incidentally, in step D005, the relay apparatus 200 can identify the service and the user on the basis of the service identification information and the user identification information included in the data selection screen request received from the multi-function device 100. Then, the relay apparatus 200 generates an electronic-data-information request corresponding to the service and the user, and transmits the electronic-data-information request to the service providing apparatus 300. At this time, the relay apparatus 200 generates the electronic-data-information request in accordance with a program according to the service designated by the user.

Specifically, in a case where the user has designated the service A, the relay apparatus 200 generates an electronic-data-information request corresponding to the service A in accordance with the URL getting program for the service A stored in the storage unit 230, and transmits the electronic-data-information request to the service providing apparatus 300A. Incidentally, the generated electronic-data-information request is an HTTP message using the API disclosed in the service A. Each service has a unique API for getting thumbnail URLs and data identification information. For this reason, the relay apparatus 200 includes programs for generating electronic-data-information requests according to the individual services. Specifically, the relay apparatus 200 includes the URL getting program for the service A for generating an electronic-data-information request for the service A, and the URL getting program for the service B for generating an electronic-data-information request for the service B. The relay apparatus 200 uses these programs to generate an electronic-data-information request corresponding to each service.

The kind of search criterion information stored in the generated electronic-data-information request depends on each service. For example, in order to search for a list of downloadable electronic data items, the service provider side may need information, such as an album ID of an album, for designating the storage position of the electronic data items. In this case, information, such as an album ID of an album which the user is using, for designating the storage position of the electronic data items is stored as search criterion information in the electronic-data-information request. Further, in order to search for the list of downloadable electronic data items, the service provider side may need information, such as a folder name, for designating the storage position of the electronic data items. In this case, information, such as a folder name which the user is using, for designating the storage position of the electronic data items is stored as the search criterion information in the electronic-data-information request.

Further, additional information other than the search criterion information may be stored in the electronic-data-information request. For example, in a case where the service provider side requires authentication information on the user for authenticating the user, the authentication information may be stored.

The search criterion information is stored in the storage unit 230 in advance. The relay apparatus 200 uses necessary additional information to generate the electronic-data-information request according to each service.

In the above description, it has been described that the additional information necessary for the electronic-data-information request is stored in the relay apparatus 200 is advance. However, the present invention is not limited thereto. For example, before each time an electronic-data-information request is generated, the relay apparatus 200 may inquire of the multi-function device 100 about necessary additional information. Upon receiving the inquiry about additional information, the multi-function device 100 displays a screen for inquiring about additional information on the display unit 150 so as to enable the user to input or select additional information. Therefore, the user can designate an album ID of a desire album or a desire folder name. Then, the multi-function device 100 transmits the additional information input or selected by the user to the relay apparatus 200. In this way, the relay apparatus 200 can designate the necessary additional information. Incidentally, in this case, the relay apparatus 200 generates an inquiring screen corresponding to each service in a markup language such as XML. This is because the kind of additional information which the user should input or select depends on each service. The relay apparatus 200 transmits a message of the inquiring screen written in the markup language such as the XML to the multi-function device 100. The multi-function device 100 can execute rendering on the basis of the received message so as to display the inquiring screen corresponding to the service designated by the service. The multi-function device 100 can display an inquiring screen according to each service so long as the multi-function device 100 includes a rendering driver of the markup language such as the XML. Therefore, the user can freely designate an album or folder from which the user wants to download a thumbnail image, according to each service.

Next, in step D006, the service providing apparatus 300 transmits a thumbnail URL and an electronic-data identification information item to the relay apparatus 200 in response to the request of the relay apparatus 200. In a case where there is a plurality of electronic data items corresponding to the received electronic data information request, the service providing apparatus 300 transmits a plurality of thumbnail URLs and a plurality of electronic data information items corresponding to the plurality of electronic data items to the relay apparatus 200.

Upon receiving the thumbnail URLs and the electronic data information items from the service providing apparatus 300, in step D007, the relay apparatus 200 generates an XML text of a data selection screen to be displayed in the multi-function device 100. The data selection screen is a screen for enabling the user to select an electronic data item to be downloaded, in the multi-function device 100. Thumbnail images of a plurality of electronic data items are arranged in the data selection screen. In the present invention, for example, it is assumed that four thumbnail images can be simultaneously displayed on the display unit 150. When the user selects a thumbnail image of a desired electronic data item from the displayed thumbnail images, the electronic data item corresponding to the selected thumbnail image is downloaded. The generated XML text includes 50 thumbnail URLs and electronic-data identification information items received from the service providing apparatus 300.

In step D008, the relay apparatus 200 transmits a message (electronic data selection screen request) including the XML text of the data selection screen generated in step D007 to the multi-function device 100. Upon receiving the XML text of the data selection screen, the multi-function device 100 executes rendering according to the XML text. At this time, in step S009, the multi-function device 100 transmits a thumbnail image screen request to the service providing apparatus 300 on the basis of the thumbnail URLs included in the XML text. The thumbnail image screen request is specifically an HTTP message using a GET method. The thumbnail image screen request includes the thumbnail URLs got from the relay apparatus 200. A server performing communication based on HTTP should support the general GET method. Therefore, although the multi-function device 100 does not include programs for generating electronic data information requests according to the individual services, unlike the relay apparatus 200, the multi-function device 100 can download thumbnail images in each service by using the GET method which is generally used to download data. The multi-function device 100 transmits a thumbnail image screen request to the service providing apparatus 300 for every four thumbnail images to be displayed on the display unit 150.

Upon receiving the thumbnail image screen request, in step D010, the service providing apparatus 300 transmits thumbnail images stored in the storage positions indicated by the URLs included in the received thumbnail images screen request, to the multi-function device 100.

Upon receiving the thumbnail images from the service providing apparatus 300, the multi-function device 100 displays a data selection screen U002 on the display unit 150. The thumbnail images received from the service providing apparatus 300 are arranged in the data selection screen U002. Therefore, the user can search for a desired electronic data item while browsing the thumbnail images.

After displaying the data selection screen U002 (see FIG. 3), the multi-function device 100 receives a selection of an electronic data item from the user. The data selection screen U002 has functions as the display unit 150 and the operation unit 180. The data selection screen U002 includes a 'Previous 50 Hits' key B01, a 'Next 50 Hits' key B02, a 'Previous Display Screen' key B03, a 'Next Display Screen' key B04, and an 'OK' key B05. In the data selection screen U002, four thumbnail images are displayed. In a case where the user touches the 'Previous 50 Hits' key B01, the multi-function device 100 requests thumbnail URLs corresponding to a page preceding a page including the thumbnail images displayed in the current data selection screen, from the service providing apparatus 300 through the relay apparatus 200. In a case where the user touches the 'Next 50 Hits' key B02, the multi-function device 100 requests thumbnail URLs corresponding to a page following the page including the thumbnail images displayed in the current data selection screen, from the service providing apparatus 300 through the relay apparatus 200. In a case where the user touches the 'Previous Display Screen' key B03, the multi-function device 100 changes the thumbnail images displayed in the current data selection screen to four previous thumbnail images. In a case where the user touches the 'Next Display Screen' key B04, the multi-function device 100 changes the thumbnail images displayed in the current data selection screen to four next thumbnail images. After the user selects an electronic data item regarding a thumbnail image, the 'OK' key B05 is used to decide the selection contents.

In the data selection screen U002, thumbnail images of a ring, a tree, an exclamation mark, and an equal mark are being displayed. When the user touches the 'Previous Display Screen' key B03 or the 'Next Display Screen' key B04, in step D011, the multi-function device 100 transmits a thumbnail image request for getting four new thumbnail images different from the thumbnail images which are being displayed. Then, upon receiving the new thumbnail images in step D012, the multi-function device 100 displays the new thumbnail images on the display unit 150 (that is, the data selection screen U002 is changed to a data selection screen having the new thumbnail images displayed therein). The user can select a desired electronic data item from the displayed new thumbnail images by touching a thumbnail image corresponding to the desired electronic data item in the operation unit 180. The data selection screen U201 shown in FIG. 4 displays thumbnail images of a triangle, a wheelchair, an interrogation mark, and a knife and fork in one thumbnail screen, and shows that electronic data items regarding the thumbnail images of the wheelchair and the knife and fork has been selected by the user.

When the user touches the 'Previous 50 Hits' key B01 or the 'Next 50 Hits' key B02 of the operation unit 180, in step D201, information representing the contents of the touched key, the page which is being displayed, and the electronic data items selected in the multi-function device 100 are notified as selection information to the relay apparatus 200. In the exemplary embodiment, the electronic data items regarding the thumbnail images of the wheelchair and the knife and fork are designated by the selection information. In step D201, it is assumed that the page which is being displayed on the display unit 150 is the first page, and the 'Next 50 Hits' key B02 has been touched by the user.

When the 'Next 50 Hits' key B02 is touched in a state in which the first page is being displayed, in step D202, the relay apparatus 200 transmits a request for getting electronic data information regarding electronic data items registered in the second page of the album. In accordance with the request for getting the electronic data information from the relay apparatus 200, in step D203, the service providing apparatus 300 transmits the electronic data information regarding the electronic data items registered in the second page of the album, to the relay apparatus 200. Then, in step D204, the relay apparatus 200 excludes information which does not correspond to electronic data items of the second page of the album, from the selection information notified in step D201, and registers the excluded information as inheritance information. Incidentally, the multi-function device 100 determines that a thumbnail image which the inheritance information represents is in a selected state, and a thumbnail image which the inheritance information does not represent is in an unselected state. In step S204, the relay apparatus 200 also generates an XML text of a data selection screen corresponding to the second page of the album.

Next, in step D205, the relay apparatus 200 transmits a message including the inheritance information registered in step D204, and the XML text of the data selection screen, to the multi-function device 100. In step D2051, the multi-function device 100 transmits a thumbnail image request to the service providing apparatus 300 on the basis of the thumbnail URLs included in the received XML text. Upon receiving the thumbnail image request, in step D2052, the service providing apparatus 300 transmits the thumbnail images to the multi-function device 100. Upon receiving the thumbnail images corresponding to the second page of the album, the multi-function device 100 displays the thumbnail images in a data selection screen U202 on the display unit 150.

The data selection screen U202 shows thumbnail images representing an electric train, a no-smoking mark, a bicycle, and a person from the left (it is determined from the data selection screen U202 that all of the thumbnail images are in the unselected state). It is assumed that the user operates the operation unit 180 so as to select the no-smoking mark, and touches the 'Previous 50 Hits' key B01 (see U203). In this case, in step D206, the multi-function device 100 notifies information representing that the second page of the album is being displayed, information representing that the 'Previous 50 Hits' key has been touched, selection information indicating an electronic data item regarding the no-smoking mark, and the inheritance information indicating the electronic data items regarding the wheelchair and the knife and fork, to the relay apparatus 200. Next, in step D207, the relay apparatus 200 transmits a request for getting electronic data information regarding the electronic data items of the first page, which is a page preceding the second page that is being displayed, of the album, to the service providing apparatus 300. Then, in step D208, the service providing apparatus 300 transmits the electronic data information regarding the electronic data items of the first page of the album, to the relay apparatus 200. In step D209 (see FIG. 5), the relay apparatus 200 excludes information corresponding to electronic data items not included in the first page of the album, from the selection information notified in step D206, and registers the excluded information as the inheritance information. Further, in step D209, the relay apparatus 200 excludes information corresponding to electronic data items of the first page of the album, from the inheritance information notified in step D206, and registers the excluded information as the selection information. That is, in step D209, the relay apparatus 200 updates the inheritance information and the selection information. Further, in step D209, the relay apparatus 200 generates an XML text of a data selection screen corresponding to the first page of the album.

In step D210, the relay apparatus 200 transmits a message including the selection information and the inheritance information updated in step D209 and the XML text of the data selection screen, to the multi-function device 100. Then, in step D211, the multi-function device 100 transmits a thumbnail image request to the service providing apparatus 300 on the basis of the thumbnail URLs included in the received XML text. Upon receiving the thumbnail image request, in step D212, the service providing apparatus 300 transmits thumbnail images to the multi-function device 100. Upon receiving the thumbnail images corresponding to the first page of the album, the multi-function device 100 displays the thumbnail images in a data selection screen U204 functioning as the display unit 150.

Figure 5B:
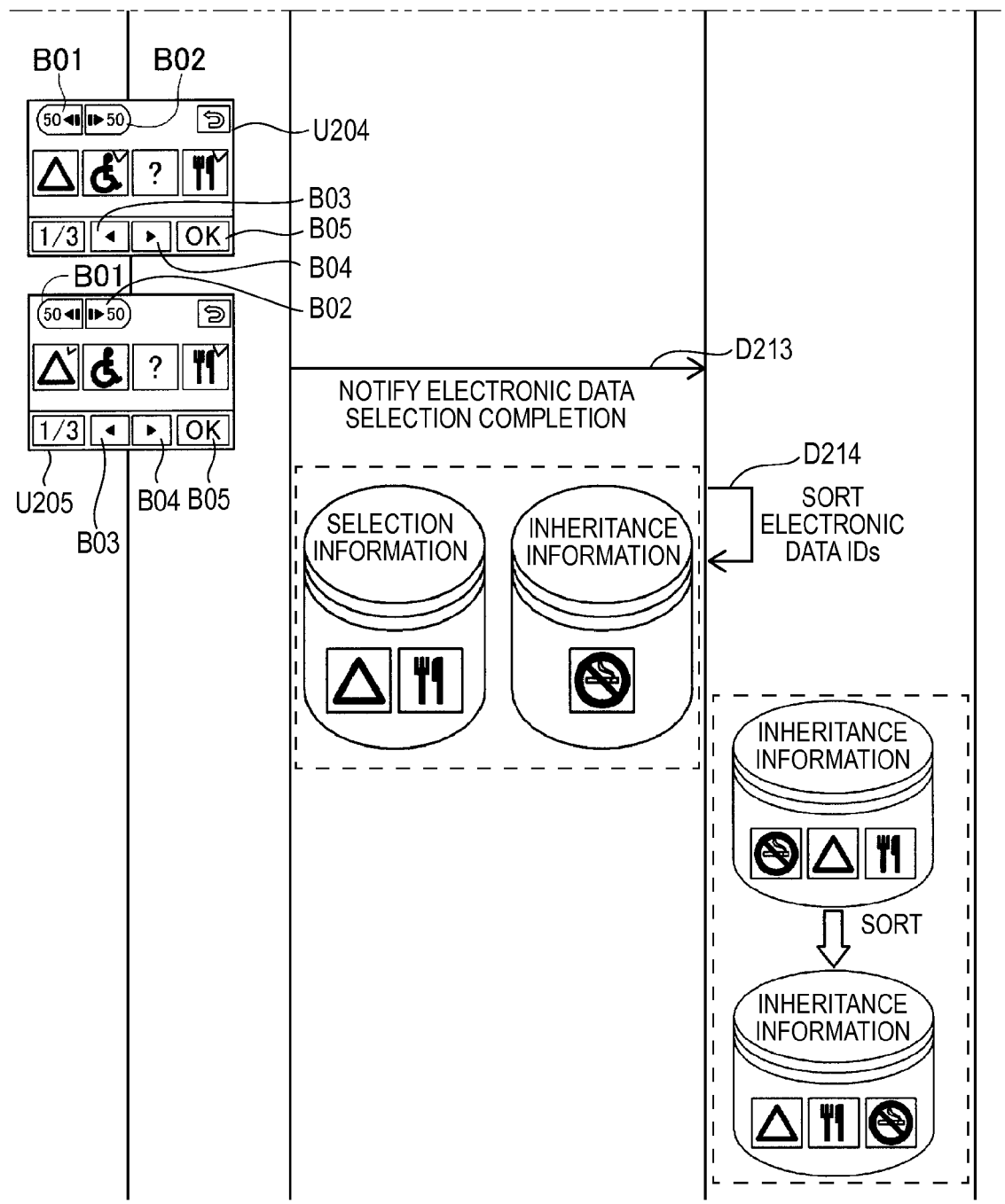
Figure 6:
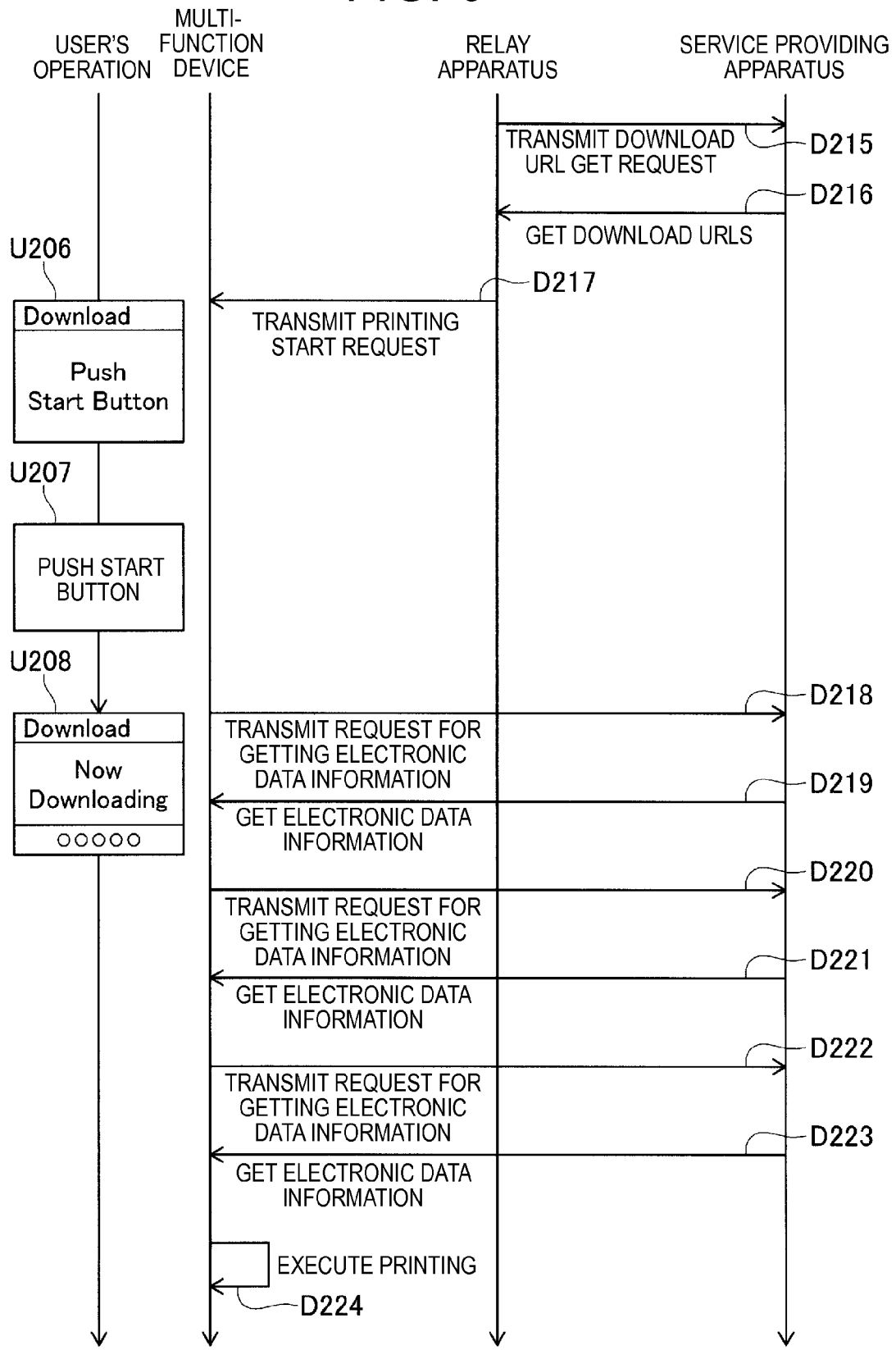
FIG. 6 is a (fourth) sequence diagram view illustrating the example of the operation of the service cooperation system.

As shown in FIG. 5, the data selection screen U204 shows the thumbnail images of the triangle, the wheelchair, the interrogation mark, and the knife and fork (it is determined from the data selection screen U204 that the wheelchair and the knife and fork are in the selected state). It is assumed that the user operates the operation unit 180 so as to deselect the selected wheelchair and select the triangle, and touches the 'OK' key B05 so as to confirm the selection (see a data selection screen U205), in response to this user's operation. In this case, in step D213, the multi-function device 100 transmits an image data selection completion notification, selection information indicating the electronic data items regarding the triangle and the knife and fork, and inheritance information indicating the no-smoking mark, to the relay apparatus 200. Then, in step D214, the relay apparatus 200 adds selection information to the inheritance information. Next, in step D215 of FIG. 6, the relay apparatus 200 transmits a request for getting URLs for downloading the electronic data items regarding the thumbnail images which the inheritance information represents, to the service providing apparatus 300. In step D216, the service providing apparatus 300 transmits information including the URLs for downloading the selected electronic data items, to the relay apparatus 200. In step D216, the relay apparatus 200 receives the information including the URLs for downloading the selected electronic data items from the service providing apparatus 300. Next, in step D217, the relay apparatus 200 generates an XML text necessary for the multi-function device 100 to download the electronic data items from the service providing apparatus 300 on the basis of the received information (information including the URLs for downloading the selected electronic data items), and transmits the XML text to the multi-function device 100.

Then, the display unit 150 displays a text for starting download and printing of the electronic data items (see a screen U206). When the user operates the operation unit 180 so as to instruct to start download and printing of the electronic data items in step U207, the multi-function device 100 downloads the electronic data items from the service providing apparatus 300 in steps D218 to D223. Then, the multi-function device 100 prints the downloaded electronic data items using the print unit 160 in step D224.

<Main Flow of Multi-Function Device 100>

Figure 9B:
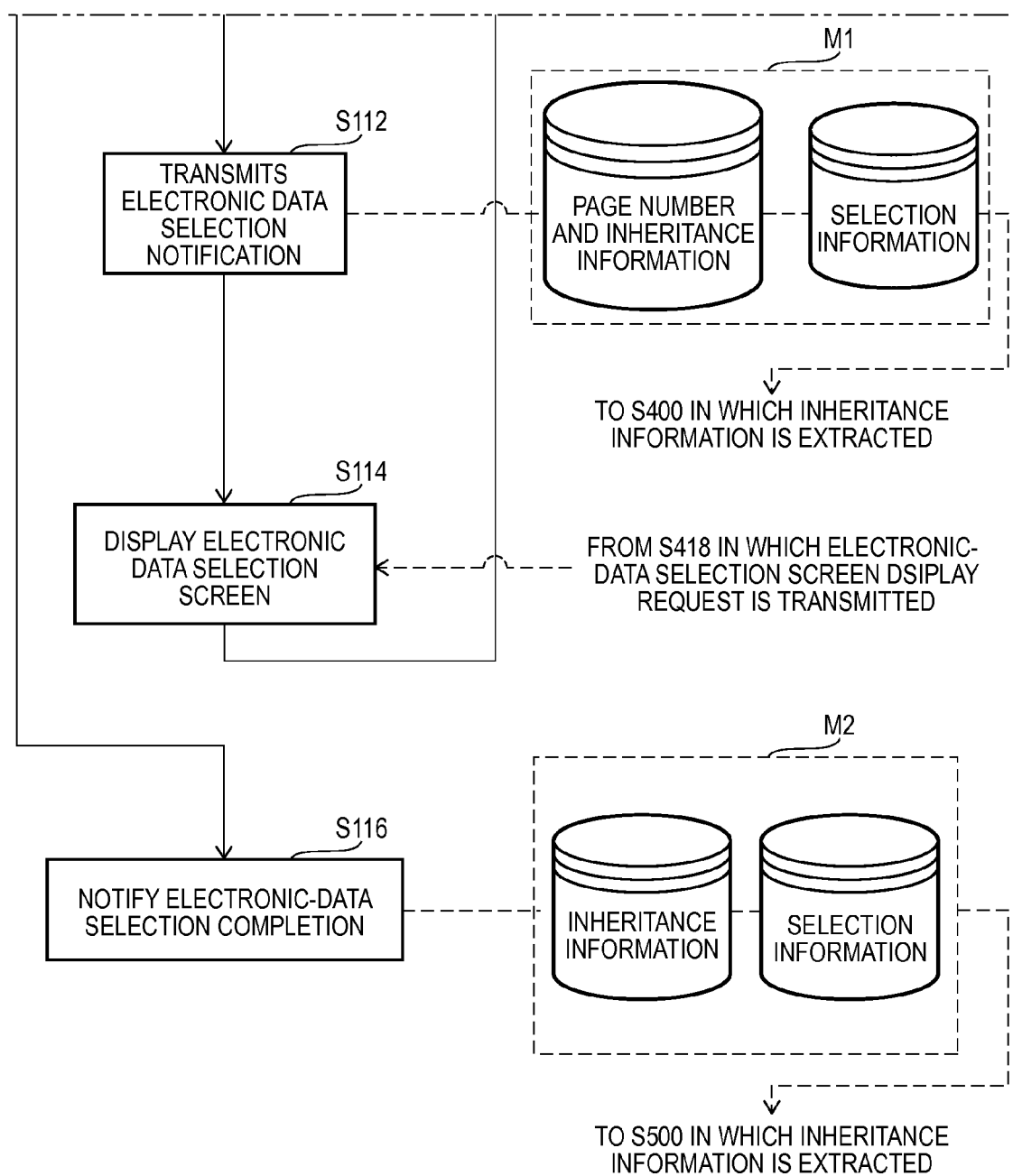

FIG. 9 shows a main flow of the multi-function device 100. First, in step S100, the control unit 120 detects which album the user has selected by controlling the operation unit 180. Then, if an album is selected, the control unit 120 controls the communication unit 110 so as to transmit an album selection notification to the relay apparatus 200 through the network 400.

Figure 10:
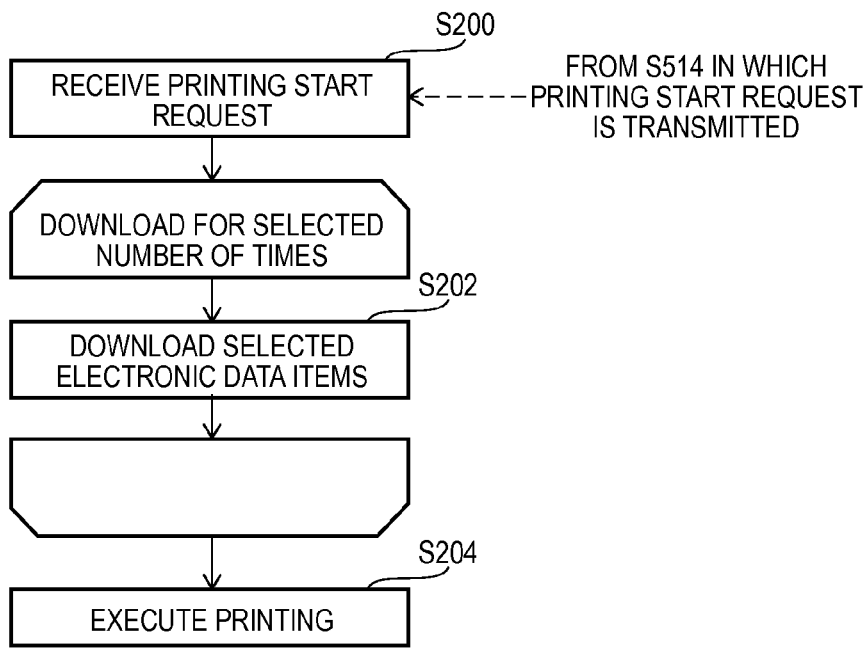
FIG. 10 is a flow chart illustrating a printing operation of the multi-function device.

After transmitting the album selection notification in step S100, if a data selection screen display request is transmitted from the relay apparatus 200 in step S308 of FIG. 10, in response to a received command, the control unit 120 controls the display unit 150 to display a data selection screen, in step S102 of FIG. 9.

Then, the control unit 120 maintains a standby state until a key operation is input (No in step S104). If the control unit 120 detects that any key has been operated (Yes in step S104), in step S106, the control unit 120 determines whether the key operation is operation according to data selection screen display. If it is determined that the key operation is not operation according to the data selection screen (No in step S106), the control unit 120 displays current selected thumbnail images in step S108, and returns to step S104 so as to enter the input standby state again.

If the control unit 120 determines that the key operation is operation according to the data selection screen (Yes in step S106), in step S110, the control unit 120 determines whether to transmit an electronic data selection notification or an electronic data selection completion notification. If it is determined to transmit the electronic data selection notification (electronic data selection notification in step S110), the electronic data items selected by the user is notified to the relay apparatus 200. This notification is transmitted by a protocol such as HTTP, and the electronic data selection is notified as selection information of POST data to the relay apparatus 200. Further, electronic data items having selected in other pages are notified as the inheritance information to the relay apparatus 200. The number of page which is being displayed on the display unit 150 also is notified to the relay apparatus 200 (see step S112 and a reference symbol M1). In response to the notification executed in step S112, a data selection screen display request is transmitted from the relay apparatus 200. Upon receiving the data selection screen display request, in step S114, the control unit 120 controls the display unit 150 to display a data selection screen. Then, the control unit 120 proceeds to step S110.

If the control unit 120 determines to transmit an electronic data selection completion notification in step S110 (electronic data selection completion notification in step S110), the control unit 120 notifies the relay apparatus 200 that the electronic data selection has been completed. The selected electronic data items are notified as the selection information of the POST data. Further, the electronic data items having been selected in the other pages are notified in the form of inheritance information (see step S116 and a reference symbol M2).

<Printing Operation of Multi-Function Device 100>

FIG. 10 shows a printing operation of the multi-function device 100. In response to the electronic data selection completion notification executed in the step S116, the relay apparatus 200 executes a printing start request in step S514 of FIG. 13. In step S200 of FIG. 10, the multi-function device 100 receives the printing start request so as to start an operation. Then, in step S202, the control unit 120 downloads the selected electronic data items from the service providing apparatus 300 based on information including the URLs for downloading the selected electronic data items contained in the printing start request. Next, in step S204, the control unit 120 controls the print unit 160 to print the electronic data items in a downloaded order thereof by the printing function.

<Electronic-Data-Information Get Operation of Relay Apparatus 200>

Figure 11:
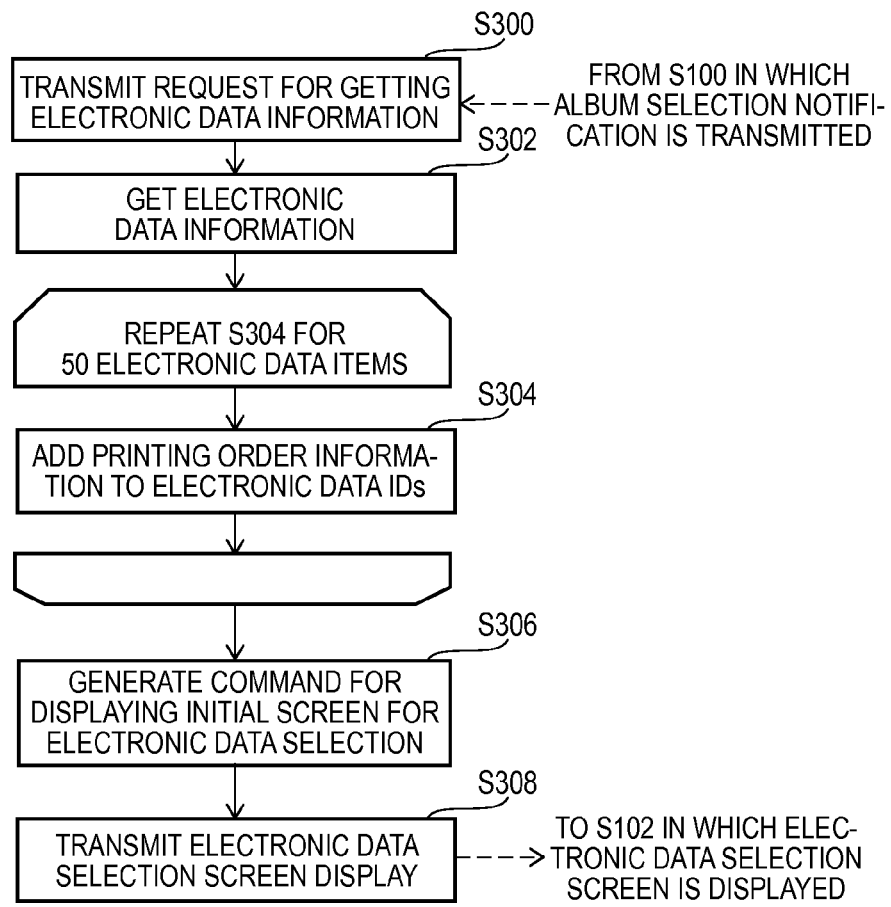
FIG. 11 is a flow chart regarding electronic data information get of the multi-function device.

FIG. 11 shows a flow chart regarding an electronic-data-information get operation of the relay apparatus 200. When the relay apparatus 200 receives an album selection notification from the multi-function device 100 and transmits a request for getting electronic data information to the service providing apparatus 300 in step S300 of FIG. 11, the service providing apparatus 300 transmits the electronic data information to the relay apparatus 200. The relay apparatus 200 gets the electronic data information from the service providing apparatus 300 in step S302. Here, the electronic data information includes URLs or the like indicating storage positions of electronic data items in the service, electronic data IDs which the service provider side uses to manage electronic data items, and so on (see FIG. 7, for example). Since each page can include up to 50 electronic data items, printing order information is added to the electronic data IDs of all of 50 electronic data items in step S304. FIG. 8 shows examples of electronic data IDs with printing order information obtained by adding printing information to the electronic data IDs. The electronic data IDs with the printing order information are identifiers obtained by adding numbers, which start from 1 and represent printing orders, to the ends of electronic data IDs shown in FIG. 7. Next, in step S306, a command to be used in the control unit 120 of the multi-function device 100 to display an initial screen for electronic data selection on the display unit 150 is generated. This command includes information such as URLs of thumbnail images of electronic data items. Next, in step S308, the control unit 220 of the relay apparatus 200 transmits a data selection screen display request to the multi-function device 100 by using the generated command.

<Inheritance Information Update of Relay Apparatus 200>

Figure 12B:
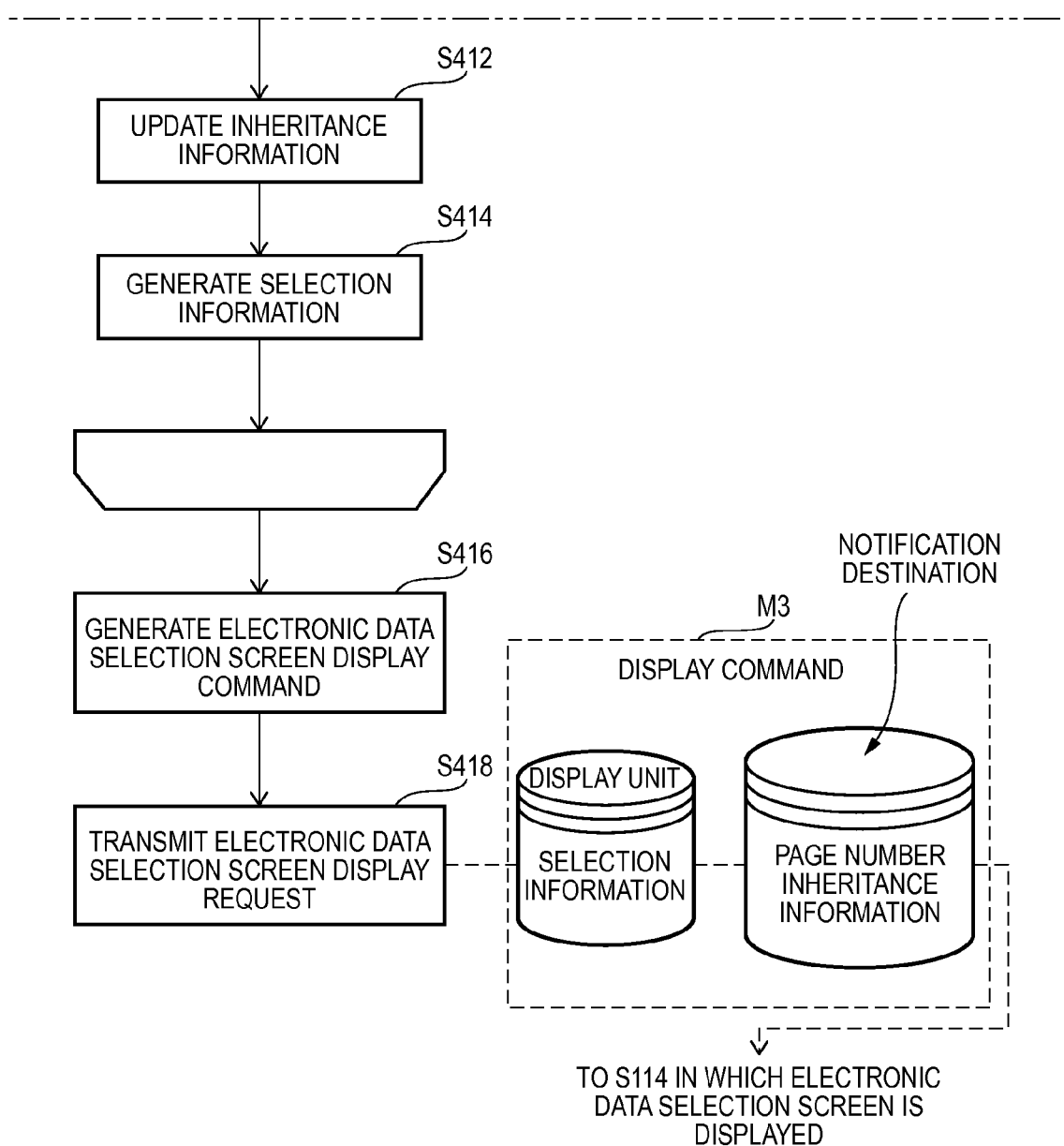

FIG. 12 shows an inheritance information updating operation of the relay apparatus 200. In step S112 of FIG. 9, the multi-function device 100 transmits the page number, the inheritance information, and the selection information to the relay apparatus 200. In step S400, the control unit 220 extracts the inheritance information from the received information. Then, in step S402, the control unit 220 adds the selection information to the inheritance information. Next, the control unit 220 transmits a request for getting electronic data information to the service providing apparatus 300 in step S404, and gets the electronic data information in step S406. As explained above, the electronic data information includes URLs or the like indicating storage positions of electronic data items in the service, electronic data IDs which the service provider side uses to manage electronic data items, and so on. In step S408, printing order information (download order information) is added to the electronic data IDs of the electronic data information got in step S406. Then, in step S410, the control unit 220 checks whether the electronic data ID included in the electronic data IDs with the printing order information (that is, the electronic data ID included in the electronic data information got in step S406) is included in the electronic data IDs of the electronic data items designated by the inheritance information. If the electronic data ID included in the electronic data information got in step S406 corresponds to an electronic data ID of an electronic data item designated by the inheritance information (Yes in step S410), in step S412, the control unit 220 updates the inheritance information. Then, in step S414, the control unit 220 updates the selection information. That is, the control unit 220 excluded the electronic data item regarding the corresponding electronic data ID from the inheritance information, and adds the excluded information to the selection information. The processes of steps S408 to S414 are executed on the electronic data information got in step S406, that is, for 50 electronic data information items corresponding to one page. Next, in step S416, the control unit 220 generates a data selection screen display command based on information including the URLs of the thumbnail images of the electronic data items, and the added printing order information and the updated inheritance information and selection information obtained by the steps of S408 to S414. Then, in step S418, the control unit 220 transmits the generated data selection screen display command to the multi-function device 100.

<Printing Start Request Issuing of Relay Apparatus 200>

Figure 13:
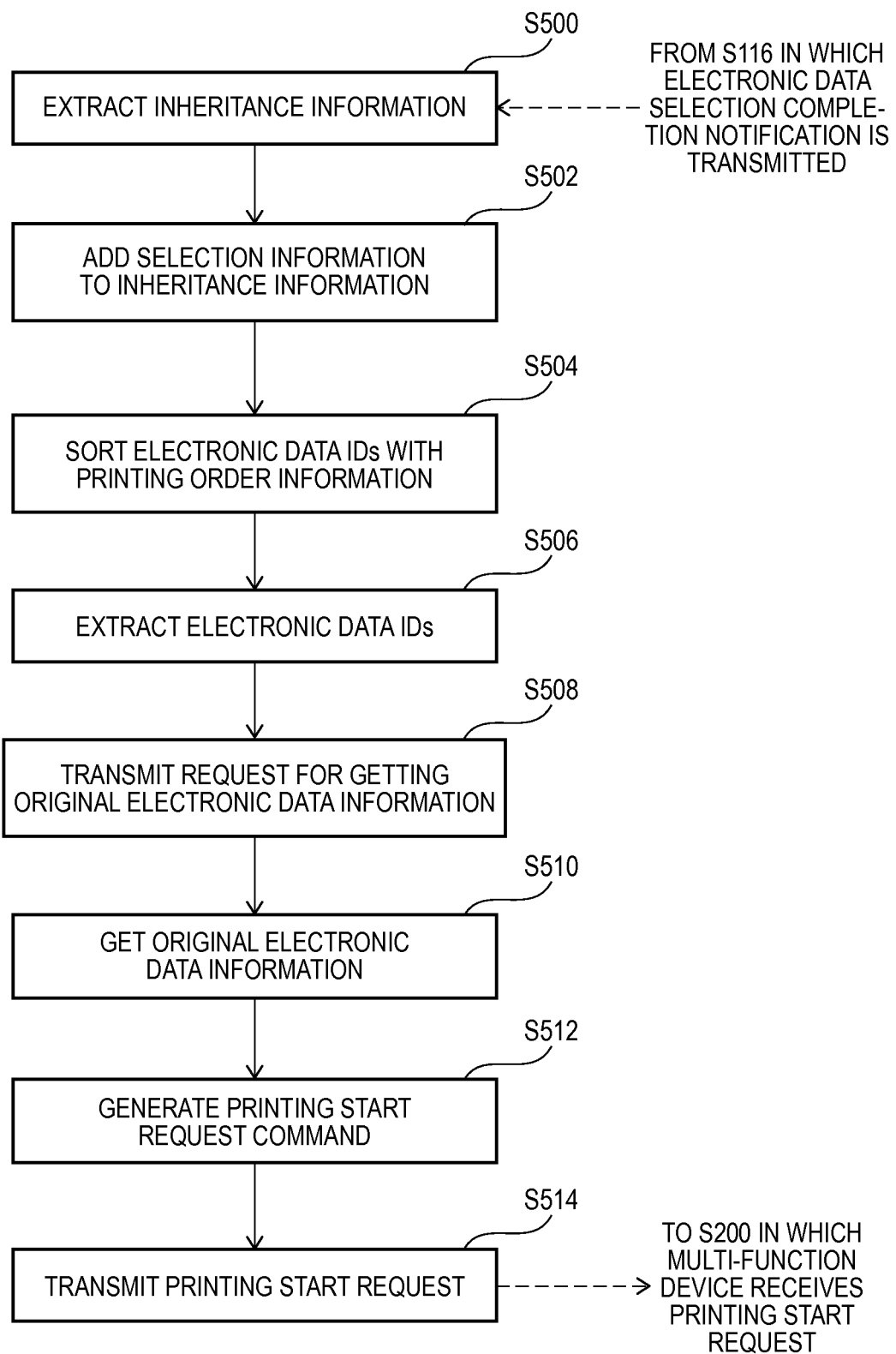
FIG. 13 is a flow chart regarding from when a relay apparatus 200 extracts the inheritance information to when the relay apparatus 200 transmits a printing start request to the multi-function device 100.

FIG. 13 shows a flow regarding printing start request issuing of the relay apparatus 200. In step S116 (FIG. 9), the multi-function device 100 transmits the electronic data selection completion notification to the relay apparatus 200. Then, in the step S500 of FIG. 13, the relay apparatus 200 extracts the inheritance information from the received inheritance information and selection information. Then, in step S502, the control unit 220 adds the selection information to the inheritance information. In this way, all the information selected on the multi-function device 100 by the user is converged into the inheritance information. Next, in step S504, the control unit 220 sorts the electronic data IDs with the printing order information (download order information). Since the multi-function device 100 prints the electronic data items in the downloaded order thereof from the service providing apparatus 300 as explained in steps S202 and S204, this operation makes it possible to arrange the printing order. Next, the control unit 220 extracts the electronic data IDs in step S506, and issues an request for getting original image information, such as URLs of an original images, corresponding to every electronic data IDs selected on the multi-function device 100, to the service providing apparatus 300. In step S510, the relay apparatus 200 gets the original image information including URLs of the original images which is transmitted in response to the request for getting the original image information by the service providing apparatus 300. Next, in step S512, the control unit 220 generates a printing start request command on the basis of the received original image information. Then, in step S514, the control unit 220 issues the printing start request to the multi-function device 100.

As described above, according to service cooperation system 10, in a stateless server which does not store status information of a terminal connected thereto, it is possible to exchange selection information indicating contents data selected by the user without storing the selection information. Further, it is possible to prevent the confusion of the user by adding the printing order information to the electronic data ID.

The relay apparatus 200 can be connected with a plurality of multi-function devices 100 to make the plurality of multi-function devices 100 and the service cooperate with each other. The business operator providing the service cooperation system to the users can maintain cooperation with other services only by updating the programs, using the APIs, of the relay apparatus 200 when necessary.

The relay apparatus 200 in the exemplary embodiment is one example of a relay apparatus of the invention. The multi-function device 100 in the exemplary embodiment is one example a communication apparatus of the invention. The service cooperation system 10 in the exemplary embodiment is one example of the communication system of the invention. Step S100 in the exemplary embodiment is one example of a contents-summary-information address request unit of the invention. Step S102 in the exemplary embodiment is one example of a contents-summary-information display unit of the invention. Step S112 in the exemplary embodiment is one example of a selection-information transmission unit of the invention. Step S116 in the exemplary embodiment is one example of a selection-completion notification unit of the invention. Step D218 in the exemplary embodiment is one example of a contents get unit of the invention. A thumbnail image of an electronic data item or a title of an electronic data items in the exemplary embodiment is one example of contents summary information of the invention. A thumbnail URL in the exemplary embodiment is one example of address information of contents summary information of the invention. Step S418 in the exemplary embodiment is one example of a contents-summary-information address transmission unit of the invention. Step S408 in the exemplary embodiment is one example of an order-information addition unit of the invention. Step S510 in the exemplary embodiment is one example of a contents-address get unit of the invention. Step S514 in the exemplary embodiment is one example of a contents-address transmission unit of the invention.

Step S504 in the exemplary embodiment is one example of a download-order sorting unit of the invention. Step S502 in the exemplary embodiment is one example of a selection-information storage unit of the invention.

It is apparent that the invention is not limited to the above-described exemplary embodiments, but may be variously modified without departing from the scope of the invention.

In the above-described exemplary embodiment, the description has been made by using a URL as an address of a thumbnail image to be downloaded or an address of an electronic data item. However, the present invention is not limited thereto.

In the above-described exemplary embodiment, the number of thumbnail URLs and electronic-data identification information items which can be downloaded at once from the service providing apparatus 300 to the relay apparatus 200 is set to 50 such that the multi-function device 100 and the relay apparatus 200 can fully process the thumbnail URLs and the electronic-data identification information items. Here, according to the specifications of the service, the amount of thumbnail URLs and electronic-data identification information items which can be transmitted at once from the service providing apparatus 300 to the relay apparatus 200 may be limited. The amount of thumbnail URLs and electronic-data identification information items may be the number of thumbnail URLs and electronic-data identification information items, or the total size of the thumbnail URLs and electronic-data identification information items, or the like. In this case, the amount of thumbnail URLs and electronic-data identification information items which can be transmitted at once from the service providing apparatus 300 to the relay apparatus 200 may be determined according to the specification of the service providing apparatus 300.

In the above-described exemplary embodiment, if the 'Previous 50 Hits' key B01 or the 'Next 50 Hits' key B02 is touched, the multi-function device 100 downloads thumbnail URLs corresponding to a page preceding or following the page including thumbnail images which is being displayed. Here, The 'Previous Display Screen' key B03 and the 'Next Display Screen' key B04 may having the functions of the 'Previous 50 Hits' key B01 and the 'Next 50 Hits' key B02, respectively. For example, it is assumed that each page includes 48 electronic data items. Then, in a case where thumbnail images regarding 49th to 52nd electronic data items belonging to the second page are being displayed in the data selection screen, if the 'Previous Display Screen' key B03 is touched, the multi-function device 100 requests thumbnail URLs corresponding to (1st to 48th) electronic data items of the first page from the relay apparatus 200. Further, in a case where thumbnail images regarding 45th to 58th electronic data items belonging to the first page are being displayed in the data selection screen, if the 'Next Display Screen' key B04 is touched, the multi-function device 100 requests thumbnail URLs corresponding to (49th to 96th) electronic data items of the second page from the relay apparatus 200. This operation makes it possible that the 'Previous Display Screen' key B03 and the 'Next Display Screen' key B04 have the functions of the 'Previous 50 Hits' key B01 and the 'Next 50 Hits' key B02.

In the above-described exemplary embodiment, the service regarding the service providing apparatus 300 manages data in units of albums. Here, in a case of a service such as flickr (registered trademark) capable of registering electronic data items in a form in which the electronic data items do not belong to albums, in the data selection screen U001, it is possible to select an electronic data item which does not belong to any album. In a case where an electronic data item which does not belong to any album is selected, the multi-function device 100 requests information on the electronic data item which does not belong to any album through the relay apparatus 200.

In the above-described exemplary embodiment, in the relay apparatus process, the control unit 220 of the relay apparatus 200 generates the XML text of the data selection screen in step S306, and transmits the XML text of the data selection screen in step S308. However, the present invention is not limited thereto. For example, the relay apparatus 200 may the entire electronic-data identification information items and thumbnail URLs received in each service to the multi-function device 100. In this case, the multi-function device 100 may generate a data selection screen on the basis of the received electronic-data identification information items and thumbnail URLs in accordance to a predetermined program prepared by the maker.

In the above-described exemplary embodiment, as information indicating a selected thumbnail image, two kinds of information, that is, the selection information and the inheritance information are used. However, only the inheritance information may be used, that is, all the selection information and the inheritance information may be converged into the inheritance information in steps S400 to S418 without distinction.

What is claimed is:
1. A communication system comprising:
a communication apparatus;
a relay apparatus connected to the communication apparatus through a network; and
a service providing apparatus connected to the communication apparatus through the network;
wherein the communication apparatus comprises:
 a contents-summary-information address request unit that requests transmission of address information of a contents summary information item on the network;
 a contents-summary-information display unit that is configured to:
  get the address information of the contents summary information item in units of pages as a response to the request of the contents-summary-information address request unit from the relay apparatus;
  get the contents summary information item from the service providing apparatus according to the address information got from the relay apparatus, the contents summary information item including a thumbnail image; and
  display the contents summary information item;
 a selection-information transmission unit that transmits, to the relay apparatus, a notification of updating of a current page and selection information of contents selected according to the contents summary information item displayed on a current page by the contents-summary-information display unit and previous selection information of contents selected according to the contents summary information item displayed on a previous page by the contents-summary-infor- mation display unit, upon updating of the current page through the contents-summary-information display unit;

a selection-completion notification unit that transmits a contents selection-completion notification to the relay apparatus; and a contents get unit that gets the contents from the service providing apparatus on the basis of address information of the contents received as a response of the contents-selection-completion notification of the selection-completion notification unit from the relay apparatus, the contents including the selected thumbnail image, and wherein the relay apparatus comprises:

an order-information addition unit that adds order information of the contents to electronic data information that is got in accordance with the previous selection information transmitted by the selection-information transmission unit;

a contents-summary-information address transmission unit that transmits, to the communication apparatus, the address information of the contents summary information item and the electronic data information, to which the order information is added, in response to the request of transmission of the address information of the contents summary information item by the contents-summary-information address request unit;

a selection information updating unit configured to, in response to receiving the notification, the selection information, and the previous selection information from the selection-information transmission unit upon updating of the current page through the contents-summary-information display unit, update the selection information and the previous selection information upon updating of the current page through the contents-summary information display unit, the selection information updating unit further configured to, in response to receiving the notification of updating of the current page, transmit a request for electronic data information to be included in an updated current page to the service providing apparatus;

wherein in response to the selection information updating unit updating the selection information and the previous selection information, the contents-summary information address transmission unit transmits, to the communication apparatus, the address information of the contents summary information item and the electronic data information in accordance with the updated selection information;

a contents-address get unit that gets the address information of the contents on the service providing apparatus, wherein the contents are selected on the basis of the selection information from the selection-completion notification unit; and a contents-address transmission unit that transmits the address information of the contents got by the contents-address get unit to the communication apparatus, thereby allowing the communication apparatus to directly retrieve the contents without the relay apparatus previously retrieving the contents.

2. The communication system according to claim 1, wherein the order information includes download order information for the contents, and wherein the relay apparatus further comprises a download-order sorting unit that sorts the selection information stored in a selection-information storage unit, on the basis of the download order information, in response to the selection-completion notification of the communication apparatus.

3. The communication system according to claim 1, wherein the selection information is identified upon receiving selection of contents on the current page, and wherein the previous selection information is identified upon receiving selection of the contents on the current page after selection of contents on the previous page.

4. The communication system according to claim 1, wherein the relay apparatus comprises a stateless server.

5. The communication system according to claim 1, wherein the relay apparatus communicates a description of a data selection screen to the communication apparatus, the description of the data selection screen including an identifier of the previous selection information.

6. The communication system according to claim 1, wherein the communication apparatus is configured to perform a printing process for the selected contents.

7. The communication system according to claim 1, wherein each page of the units of pages comprises a unit of contents summary information items, wherein a number of items is set to be a number which can be downloaded from a service providing apparatus at once.

8. The communication system according to claim 7, wherein the contents summary information items include thumbnail URLs, electronic data identifiers, and title information.

9. The communication system according to claim 1, wherein, prior to transmission of the contents selection-completion notification to the relay apparatus, the communication device receives the thumbnail image from the service providing apparatus.

10. The communication system according to claim 1, wherein the communication apparatus further comprises a memory, and wherein the communication apparatus is configured to:

store the got address information in the memory; and in response to receiving the updated address information from the relay apparatus by transitioning the page through the contents-summary-information display unit, update the address information in the memory.

11. A communication apparatus connected to a relay apparatus and a service providing apparatus through a network, the communication apparatus comprising:

a contents-summary-information address request unit that requests transmission of address information of a contents summary information item on the network;

a contents-summary-information display unit that is configured to:

get the address information of the contents summary information item in units of pages as a response of the request of the contents-summary-information address request unit from the relay apparatus;

get the contents summary information item from the service providing apparatus according to the address information got from the relay apparatus, the contents summary information item including a thumbnail image; and display the contents summary information item;

a selection-information transmission unit that transmits, to the relay apparatus, a notification of updating of a current page and selection information of contents selected according to the contents summary information item displayed on a current page by the contents-summary-information display unit, together with previous selection information of contents selected according to the contents summary information item displayed on a previous page by the contents-summary-information display unit, wherein the selection information and the previous selection information are updated and transmitted from the relay apparatus to the communication apparatus receiving the notification of updating of the current page, a selection information updating unit of the relay apparatus is configured to, in response to receiving the notification of updating of the current page, transmit a request for electronic data information to be included in an updated current page to the service providing apparatus;

a selection-completion notification unit that transmits a contents-selection-completion notification to the relay apparatus;

a contents get unit that gets the contents directly from the service providing apparatus on the basis of address information of the contents received as a response of the contents-selection-completion notification of the selection-completion notification unit from the relay apparatus without the relay apparatus previously retrieving the contents, the contents including the selected thumbnail image; and a print unit configured to perform a printing process for the selected contents.

12. The communication apparatus according to claim 11, further comprising:
a display information update unit that requests update of the contents summary information item displayed by the contents-summary-information display unit,
wherein in a case where update is requested by the display information update unit, address information of a new contents summary information item is got in response to a request of the contents-summary-information address request unit.

13. The communication apparatus according to claim 11, further comprising:
a memory,
wherein the communication apparatus is configured to:
store the got address information in the memory; and
in response to receiving the updated address information from the relay apparatus by transitioning the page through the contents-summary-information display unit, update the address information in the memory.

14. A control method of a relay apparatus connected to a communication apparatus and service providing apparatus through a network, the control method comprising:
receiving at the relay apparatus, from the communication apparatus, a request for transmission of address information of a contents summary information item on the network;
adding order information of contents to electronic data information that is received in accordance with previous selection information transmitted by the communication apparatus;
transmitting, to the communication apparatus, address information of the contents summary information item and electronic data information, to which the order information is added, in response to a request of transmission of the address information of the contents summary information item from a contents-summary-information address request unit of the communication apparatus;
receiving, from the communication apparatus, selection information of contents and a notification of updating of a current page upon updating of the current page through a contents-summary information display unit of the communication apparatus, the selection information of contents including contents selected in association with the contents summary information item together with contents selected from previous selection information of contents;
in response to receiving the notification of updating of the current page, transmitting a request for electronic data information to be included in an updated current page to the service providing apparatus;
in response to receiving the selection information of contents, updating the selection information including the contents selected and the previous selection information in response to updating of the current page through the contents-summary information display unit;
wherein, in response to updating the selection information, transmitting, to the communication apparatus, the address information of the contents summary information item and the electronic data information in accordance with the updated selection information;
obtaining address information of the contents on the service providing apparatus, wherein the contents are selected on the basis of the selection information in response to the selection-completion notification from the communication apparatus; and
transmitting the address information of the contents to the communication apparatus, thereby allowing the communication apparatus to directly retrieve the contents without the relay apparatus previously retrieving the contents.

15. A non-transitory computer-readable medium having a control program stored thereon and readable by a computer for controlling a relay apparatus connected to a communication apparatus and service providing apparatus through a network, said control program, when executed by the computer, causes the computer to function as:
an order-information addition unit that adds order information of the contents to electronic data information that is got in accordance with the previous selection information transmitted by the communication apparatus;
a contents-summary-information address transmission unit that transmits, to the communication apparatus, address information of the contents summary information item and the electronic data information, to which the order information is added, in response to the request of transmission of the address information of the contents summary information item from the communication apparatus;
a selection information updating unit configured to, in response to receiving notification of updating of a current page, selection information, and previous selection information from the communication apparatus upon receiving notification of updating of the current page through a contents-summary-information display unit of the communication apparatus, update the selection information and the previous selection information upon updating of the current page through the contents-summary-information display unit and transmit a request for electronic data information to be included in an updated current page to the service providing apparatus;
wherein in response to the selection information updating unit updating the selection information and the previous selection information, the contents-summary-information address transmission unit transmits, to the communication apparatus, the address information of the contents summary information item and the electronic data information in accordance with the updated selection information;

a contents-address get unit that gets the address information of the contents on the service providing apparatus, wherein the contents are selected on the basis of the selection information in response to the selection-completion notification from the communication apparatus; and a contents-address transmission unit that transmits the address information of the contents got by the contents-address get unit to the communication apparatus, thereby allowing the communication apparatus to directly retrieve the contents without the relay apparatus previously retrieving the contents.

* * * * *